United States Patent
Mansour et al.

(10) Patent No.: US 7,545,235 B2
(45) Date of Patent: Jun. 9, 2009

(54) DIELECTRIC RESONATOR FILTER ASSEMBLIES AND METHODS

(76) Inventors: Raafat R. Mansour, 310 Amberwood Dr., Waterloo, Ontario (CA) N2T 2G2; Rui Zhang, 304-350 Columbia Street West, Waterloo, Ontario (CA) N2L 6P4

( * ) Notice: Subject to any disclaimer, the term of this patent is extended or adjusted under 35 U.S.C. 154(b) by 164 days.

(21) Appl. No.: 11/634,917

(22) Filed: Dec. 7, 2006

(65) Prior Publication Data

US 2007/0126528 A1 Jun. 7, 2007

Related U.S. Application Data

(60) Provisional application No. 60/742,912, filed on Dec. 7, 2005.

(51) Int. Cl.
*H01P 1/20* (2006.01)
*H01P 5/12* (2006.01)
*H01P 7/10* (2006.01)

(52) U.S. Cl. .................. 333/134; 333/202; 333/219.1
(58) Field of Classification Search ............ 333/219, 333/219.1, 134, 202, 204, 205
See application file for complete search history.

(56) References Cited

U.S. PATENT DOCUMENTS

| | | | | | |
|---|---|---|---|---|---|
| 4,745,379 | A | * | 5/1988 | West et al. | 333/206 |
| 4,837,535 | A | * | 6/1989 | Konishi et al. | 333/210 |
| 5,382,931 | A | | 1/1995 | Piloto et al. | |
| 5,537,082 | A | * | 7/1996 | Tada et al. | 333/202 |
| 6,160,463 | A | * | 12/2000 | Arakawa et al. | 333/202 |
| 6,184,758 | B1 | | 2/2001 | Ishikawa et al. | |
| 6,621,381 | B1 | | 9/2003 | Kundu et al. | |
| 6,853,271 | B2 | * | 2/2005 | Wilber et al. | 333/209 |

FOREIGN PATENT DOCUMENTS

EP    0 964 471 A1    12/1999

OTHER PUBLICATIONS

T. Hiratsuka, et al., "K-band planar type dielectric resonator filter with high-/spl epsiv/ ceramic substrates", Microwave Symposium Digest, 1998 IEEE MTT-S International vol. 3, Jun. 7-12, 1998 pp. 1311-1314 vol. 3.

Y. Ishikawa, et al., "V band planar type dielectric resonator filter fabricated in ceramic substrate", Milimeter Waves, 1997 Topical Symposium on Jul. 7-8, 1997 pp. 93-96.

(Continued)

*Primary Examiner*—Benny Lee
*Assistant Examiner*—Kimberly E Glenn
(74) *Attorney, Agent, or Firm*—Bereskin & Parr LLP; Isis E. Caulder

(57) ABSTRACT

A unitary resonator assembly for use in dielectric resonator filters and multiplexers. The unitary resonator assembly comprises a plurality of resonators joined by bridges, where the resonators and bridges are all constructed from a single piece of a dielectric material. The unitary resonator assemblies may be used in conjunction with unitary mounting structures that support a unitary resonator assembly in a filter or multiplexer. Also disclosed are 2-pole, 4-pole, and triplet filters implementing a unitary resonator assembly in conjunction with a unitary mounting structure, and a diplexer implementing a unitary resonator assembly in conjunction with a unitary mounting structure.

20 Claims, 15 Drawing Sheets

OTHER PUBLICATIONS

S. Moraud, "A new planar dielectric resonator for microwave filtering", Microwave Symposium Digest, 1998 IEE MTT-S International vol. 3, Jun. 7-12, 1998 pp. 1307-1310 vol. 3.

Zhanzhan Wu, et al., Multi-mode network analysis of transmission characteristics for periodic dielectric structures, IEEE Antennas and Propagation Society International Symposium, 2003 Digest. Aps. Columbus, OH, Jun. 22-27, 2003 New York, NY: IEEE, U.S., vol. 4 of 4.

European Search Report dated May 22, 2007.

R. Zhang et al, "Dielectric Resonator Filters Fabricated from High-K Ceramic Substrates", IEEE Microwave Symposium Digest, Jun. 2006, MTT-S International pp. 234 to 237.

Toshiro Hiratsuka et al., "K-band Planar Type Dielectric Resonator Filter with High-E Ceramic Substrate," IEEE MTT-S, vol. 3, Baltimore, Jun. 1998, pp. 1311-1314.

S. Moraud et al., "A New Planar Type Dielectric Resonator For Microwave Filtering," IEEE MTT-S, vol. 3, Baltimore, Jun. 1998, pp. 1307-1310.

\* cited by examiner

DIELECTRIC RESONATOR FILTER ASSEMBLIES AND METHODS

FIELD

The embodiments described herein relate to microwave filters, and more particularly to dielectric resonator filters.

BACKGROUND

Dielectric resonator (DR) filters are band pass filters for microwaves that provide an alternative to resonant cavity filters. A DR filter comprises a plurality of spatially separated dielectric resonators supported in an assembly, wherein the dielectric resonators are electromagnetically coupled. An electromagnetic wave is introduced into the assembly, and excites the resonators, producing a filtering resonance response in the filter that may then transmit a filtered signal.

Dielectric resonator filters are widely used in wireless base stations, satellites and other communications and space applications, due to their superior performance and miniaturization as well as their wide commercial availability. The use of DR filters in many applications is limited, however, because prior art DR filters are relatively expensive, and are not amenable to mass production.

There are two configurations of DR filters that are most commonly used in the art. In the first configuration, individual dielectric resonators are supported axially in a metallic enclosure, in which it is difficult to physically support the resonators. In the second configuration, individual resonators are mounted in a planar configuration. In the latter case, dielectric resonators are centered in position and mounted inside a filter housing using supports formed of a material having a low dielectric constant and a low loss. In some cases, such as in a triplet with negative cross-coupling, additional pins are required in the assembly for coupling.

The frequency response of a DR filter is dependent on the design of the resonators, and on the couplings between them. The couplings are dependent on the distance between the resonators. Thus, in a conventional DR filter design, any error in the placement of the dielectric resonators on the supports may have a significant effect on the performance of the filter.

The critical nature of the positioning of each resonator in a filter, and the number of separate components that must be assembled in a given filter, lead to a high cost of assembly, alignment and integration of the combined dielectric resonator and support structure, which becomes a major factor contributing to the overall cost of the DR filters. Grinding the individual resonators and machining the individual supports is another key factor in the overall cost of DR filters.

Therefore, there remains a need for a new DR filter that is suitable for low-cost mass production.

SUMMARY

The embodiments described herein provide in one aspect, a unitary resonator assembly for use in a dielectric resonator filter, said unitary resonator assembly comprising:
(a) a first dielectric resonator;
(b) a second dielectric resonator;
(c) at least one bridge for connecting the first and second dielectric resonators; and
(d) the first dielectric resonator, the second dielectric resonator and the at least one bridge being integrally formed within a single piece of dielectric substrate.

The embodiments described herein provide in another aspect, a unitary resonator assembly for use in a dielectric resonator multiplexer, said unitary resonator assembly comprising:
(a) a first dielectric resonator;
(b) a second dielectric resonator;
(c) at least one bridge for connecting the first and second dielectric resonators; and
(d) the first dielectric resonator, the second dielectric resonator and the at least one bridge being integrally formed within a single piece of dielectric substrate.

The embodiments described herein provide in another aspect, a dielectric resonator filter comprising a unitary resonator assembly, said unitary resonator assembly comprising:
(a) a first dielectric resonator;
(b) a second dielectric resonator;
(c) at least one bridge for connecting the first and second dielectric resonators; and
(d) the first dielectric resonator, the second dielectric resonator and the at least one bridge being integrally formed within a single piece of dielectric substrate.

The embodiments described herein provide in another aspect, a triplet dielectric resonator filter comprising a unitary resonator assembly, said unitary resonator assembly comprising:
(a) a first dielectric resonator;
(b) a second dielectric resonator;
(c) at least one bridge for connecting the first and second dielectric resonators;
(d) the first dielectric resonator, the second dielectric resonator and the at least one bridge being integrally formed within a single piece of dielectric substrate; and
(e) a conductor strip positioned on the surface of the unitary resonator assembly for negative cross coupling.

The embodiments described herein provide in another aspect, a dielectric resonator multiplexer comprising a unitary resonator assembly, said unitary resonator assembly comprising:
(a) a first dielectric resonator;
(b) a second dielectric resonator;
(c) at least one bridge for connecting the first and second dielectric resonators; and
(d) the first dielectric resonator, the second dielectric resonator and the at least one bridge being integrally formed within a single piece of dielectric substrate.

The embodiments described herein provide in another aspect, a method of manufacturing a unitary resonator assembly for use in a dielectric resonator filter, said method comprising:
(a) providing a dielectric material;
(b) integrally shaping in the dielectric material a first dielectric resonator, a second dielectric resonator, and at least one bridge for connecting the first and second dielectric resonators.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1A:
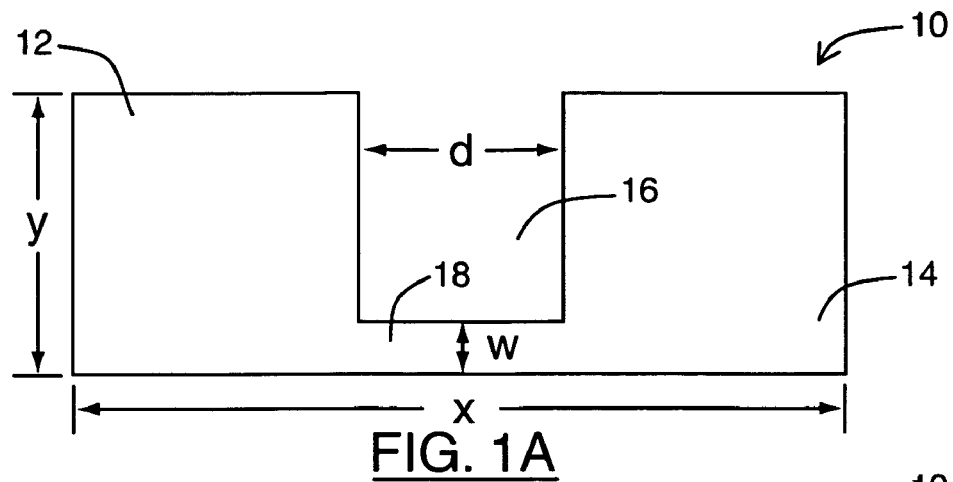
FIG. 1A is a top view of an exemplary embodiment of a unitary resonator assembly for a 2-pole DR filter.

It will be appreciated that for simplicity and clarity of illustration, elements shown in the figures have not necessary been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Figure 1B:
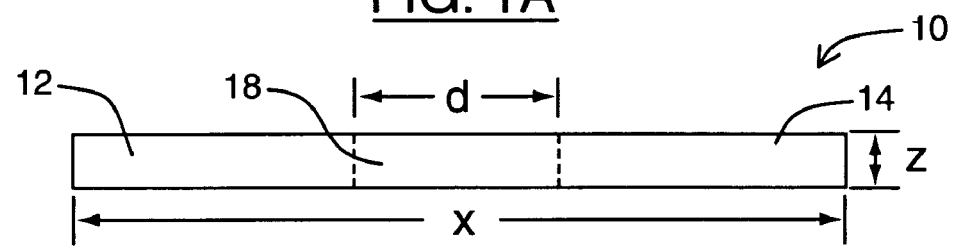
FIG. 1B is a cross-sectional side view of the unitary resonator assembly of FIG. 1A.

Reference is first made to FIGS. 1A and 1B, which show a top view and a cross-sectional side view, respectively, of an exemplary embodiment of a unitary resonator assembly 10, for use in a 2-pole DR filter. The unitary resonator assembly 10 has a generally rectangular shape, with a length, x, a width, y, and a depth, z. It should be understood that, in other embodiments, the unitary resonator may have a different shape. The unitary resonator assembly 10 comprises a first resonator 12, and a second resonator 14 separated by an air gap 16 at a distance d apart, and joined by a bridge 18 of width w, which lies at one end of the air gap 16.

In operation in a 2-pole DR filter, each of the first resonator 12 and second resonator 14 resonates. The combination of the bridge 18 and air gap 16 provides electromagnetic coupling between the first resonator 12 and second resonator 14. The electromagnetic coupling is dependent on the distance d between the resonators, and the width w of the bridge 18 joining the first resonator 12 to the second resonator 14. The values of d and w are chosen to elicit the desired response from the unitary resonator assembly 10. The bridge 18 has the additional function of maintaining the relative spatial placement and orientation of the first resonator 12 and second resonator 14.

The unitary resonator assembly 10 is formed from a single undivided piece of a dielectric substrate having a high dielectric constant. Any method known in the art, for example laser machining or waterjet cutting, or shaping with stereographic lithography may be used to cut the substrate. The waterjet cutting technique uses a powerful stream of cold water mixed with a certain amount of fine sands applied to the substrate to make a cutting. The waterjet technique prevents distortion of the dielectric material, as there is no heat input in the method.

Figure 1C:
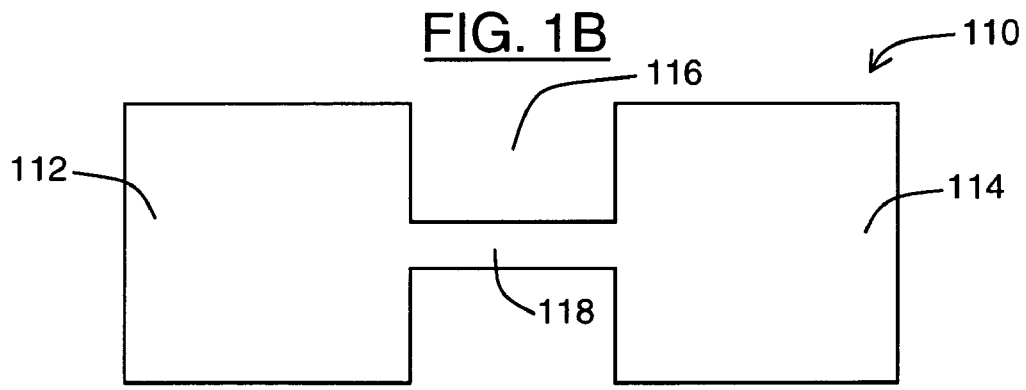
FIG. 1C is a top view of an alternate embodiment of a unitary resonator assembly of FIG. 1A.
Figure 1D:
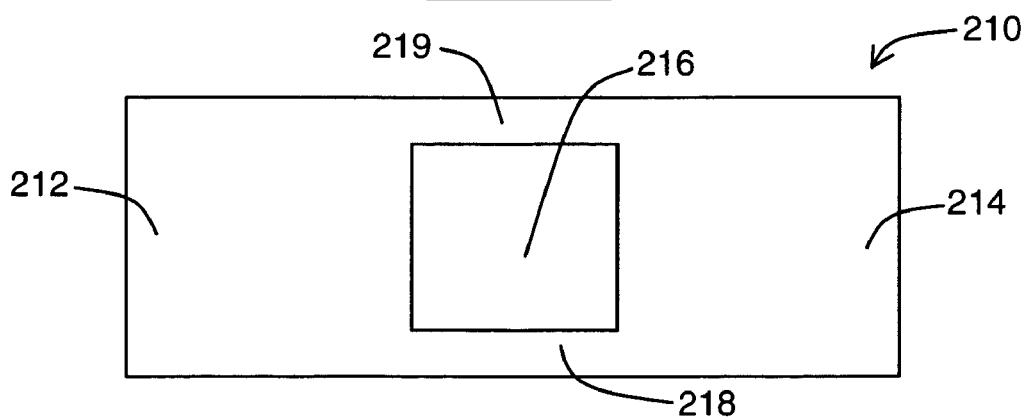
FIG. 1D is a top view of an alternate embodiment of a unitary resonator assembly of FIG. 1A.

FIGS. 1C and 1D show further embodiments of the unitary resonator assembly for use in a 2-pole DR filter. As shown, the alternative embodiments include many elements of the unitary resonator assembly shown in FIGS. 1A and 1B, including a first resonator 112, 212, a second resonator 114, 214, an air gap 116, 216 and at least one bridge(s) 118, 218, 219 which operate as described above with respect to FIGS. 1A and 1B. The unitary resonator assembly 110 shown in FIG. 1C, has a bridge 118 that is located at the midpoint of the air gap 116. In FIG. 1D, the unitary resonator 210 assembly includes a first bridge 118 positioned at a first end of the air gap 216, and a second bridge 219 positioned at a second end of the air gap 216. It will be understood that the location, dimensions, shape and number of the bridge(s), the shape of the individual resonators 26, 28, and the shape of the unitary resonator assembly 10 itself may be modified to change the coupling value of the unitary resonator assembly, without departing from the scope of the invention.

Figure 2:
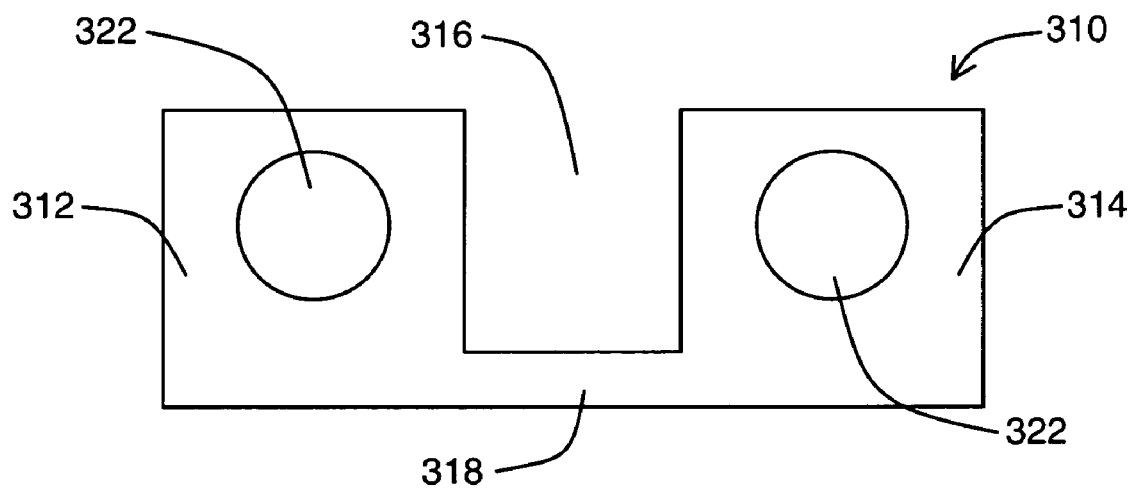
FIG. 2 is a top view of another alternate embodiment of a unitary resonator assembly for a 2-pole DR filter.

Reference is now made to FIG. 2, which shows a top view of another exemplary embodiment of the unitary resonator assembly 310 for a 2-pole DR filter. The unitary resonator assembly 310 is similar to the unitary resonator assembly 10 shown in FIG. 1A. The unitary resonator assembly includes a first resonator 312, a second resonator 314, an air gap 316 and a bridge 318, which generally operate as described above with respect to FIGS. 1A to 1D. Similar components are similarly numbered. Each of the first resonator 312 and second resonator 314 in the unitary resonator assembly shown in FIG. 2 defines a circular hole 322 at its centre. In operation in a DR filter, the presence of the circular hole 322 at the centre of each resonator suppresses an unwanted spurious resonance mode of the unitary resonator assembly 310.

It will be understood that the shape, number, and position of the holes may be modified to achieve a new coupling value, without departing from the scope of the present invention. It will also be understood that the location, dimensions, shape and number of the bridge(s), the shape of the individual resonators 26, 28, and the shape of the unitary resonator assembly 10 itself may be modified to change the coupling value and the resonance modes of the unitary resonator assembly. Specifically, the filter may exhibit TE, TM and HE modes, in single, dual or triple modes without departing from the scope of the invention.

Figure 3A:
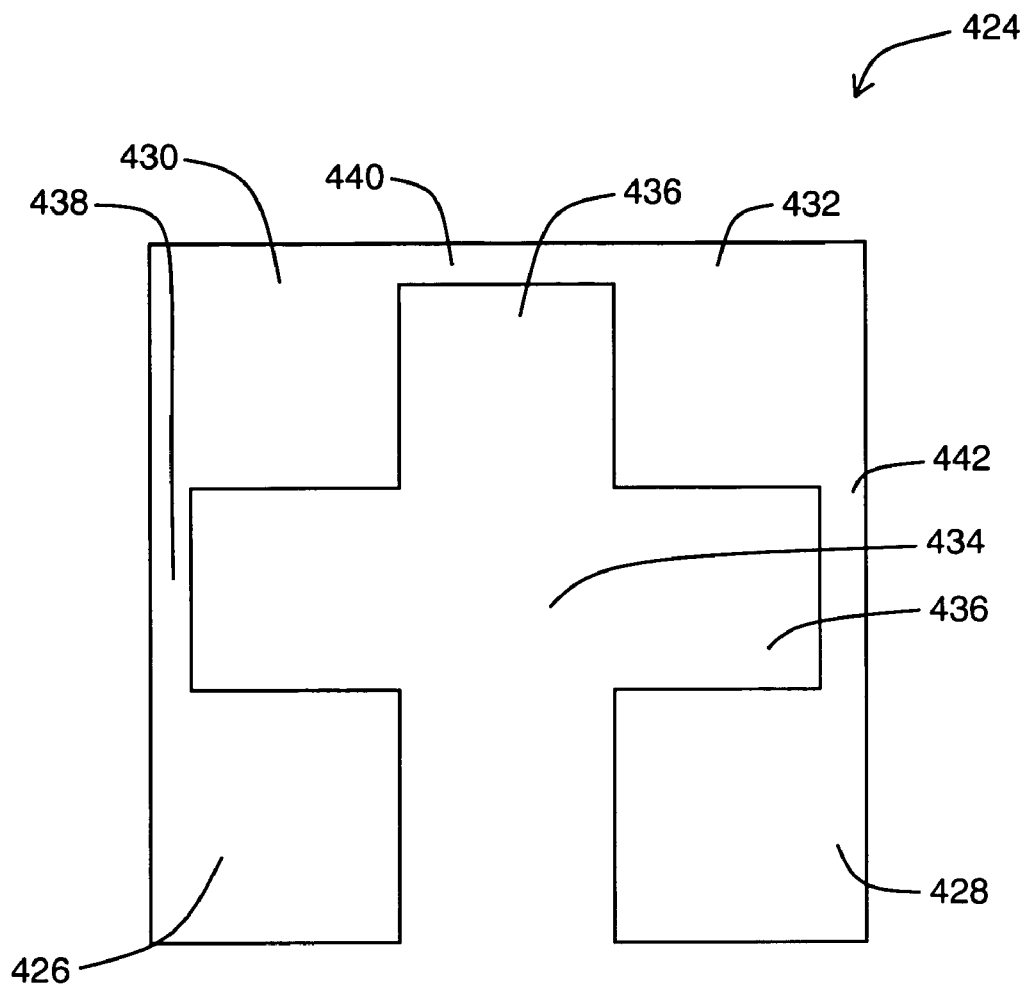
FIG. 3A is a top view of another exemplary embodiment of a unitary resonator assembly for a 4-pole DR filter.
Figure 3B:
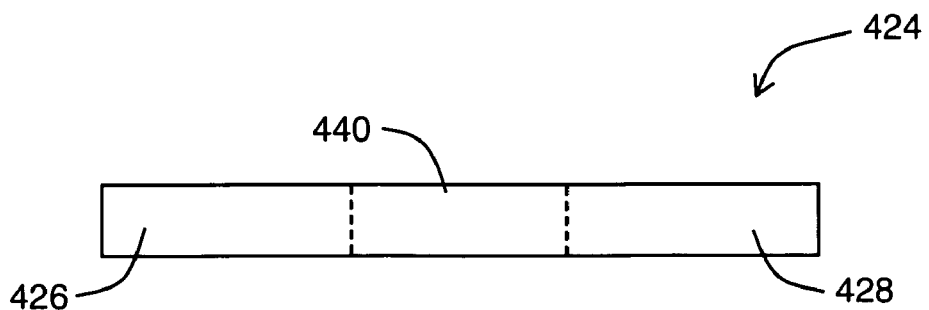
FIG. 3B is a cross-sectional side view of the unitary resonator assembly of FIG. 3A.

Reference is now made to FIGS. 3A and 3B, which show a top and cross-sectional side view, respectively, of another exemplary embodiment of a unitary resonator assembly 424 for use in a 4-pole DR filter. The unitary resonator assembly 424 has a generally rectangular shape. The unitary resonator assembly 424 may have a variety of other shapes in other embodiments. The unitary resonator assembly 424 comprises an input resonator 426, an output resonator 428, a first additional resonator 430 and a second additional resonator 432 in a rectangular configuration, with each of the four resonators 426, 428, 430, 432 forming one of the four corners of the rectangle.

The four resonators 426, 428, 430, 432 are separated by a cross-shaped air gap 434 composed of four gap branches 436. The unitary resonator assembly 424 further comprises a first bridge 438, a second bridge 440 and a third bridge 442. The input resonator 426 and the first additional resonator 430 are separated by a gap branch 436 and joined by the first bridge 438, the first additional resonator 430 and the second additional resonator 432 are separated by a gap branch 436 and are joined by the second bridge 440, and the second additional resonator 432 and the output resonator 428 are separated by a gap branch 436 and are joined the third bridge 442. Each of the three bridges 438, 440, 442 is located at the outer end of the gap branch 436 that it bridges, adjacent to the perimeter of the unitary resonator assembly 424.

In operation in a 4-pole DR filter, each of the input resonator 426, output resonator 428, first additional resonator 430 and second additional resonator 432 resonates. The combination of the bridges 438, 440, 442 and gap branches 436 provides electromagnetic coupling between the four resonators 426, 428, 430, 432, but in the 4-pole configuration of the unitary resonator assembly 424 shown in this embodiment, additional structures in a 4-pole DR filter may be required in to achieve the desired electromagnetic coupling. The first bridge 438, second bridge 440, and third bridge 442 have the additional function of maintaining the relative spatial placement and orientation of each of the input resonator 426, first additional resonator 430, second additional resonator 432, and output resonator 428.

The unitary resonator assembly 424 is formed from a single undivided piece of a dielectric substrate having a high dielectric constant. Any method known in the art, for example laser machining, stereolithography or waterjet cutting, as described above with respect to the unitary resonator assembly for a 2-pole DR filter shown in FIGS. 1A and 1B, may be used to cut the substrate.

It should be understood that the location, dimensions, shape and number of the bridges as described above may be modified, as may the shape of the individual resonators 426, 428, 430, 432 and the unitary resonator assembly 424, in order to achieve a new coupling value and new resonance modes of the unitary resonator assembly 410. In still other embodiments, the number of additional resonators may be increased to form other multi-pole DR resonators, without departing from the scope of the invention.

Figure 4:
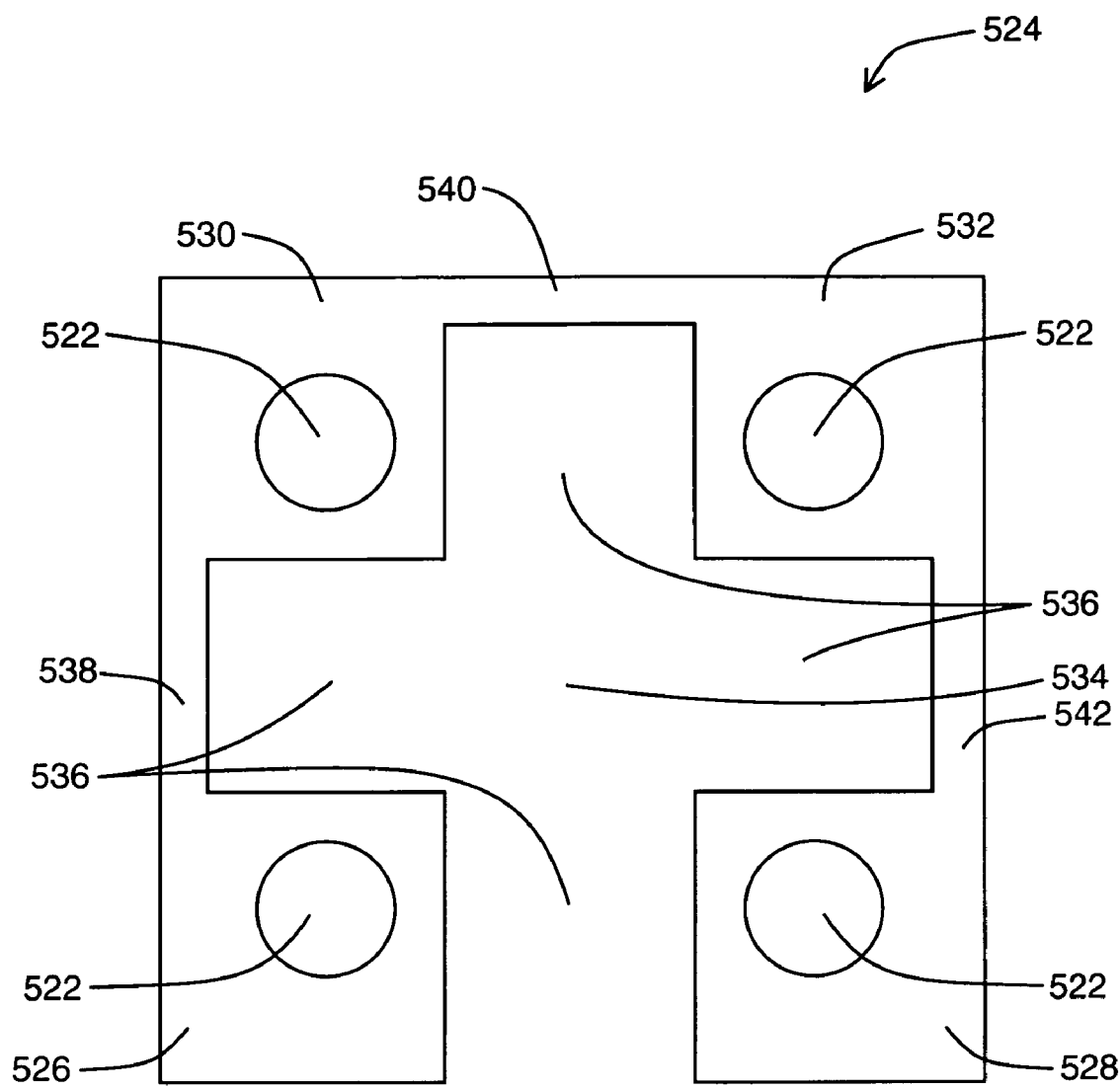
FIG. 4 is a top view of another exemplary embodiment of a unitary resonator assembly for a 4-pole DR filter.

Reference is now made to FIG. 4, which shows a top view of another exemplary embodiment of the unitary resonator assembly 524 for a 4-pole DR filter. The unitary resonator assembly 524 is similar to the assembly shown in FIGS. 3A and 3B, comprising an input resonator 526, an output resonator 528, a first additional resonator 530 and a second additional resonator 532, an air gap 534 comprised of four gap branches 536 and a first bridge 538, a second bridge 540 and a third bridge 542, which operate as described above with respect to FIG. 3. Each of the input resonator 526, output resonator 528, first additional resonator 530 and second additional resonator 532 in the unitary resonator assembly 524 shown in FIG. 4 defines a circular hole 522 at its centre. In operation in a 4-pole DR filter, the presence of the circular hole 522 at the centre of each of the input resonator 526, output resonator 528, first additional resonator 530 and second additional resonator 532 suppresses an unwanted spurious resonance mode of the unitary resonance assembly 524.

It will be understood that the shape, number and position of the holes in the unitary resonator assembly may be modified to achieve a new coupling value, without departing from the scope of the invention. Similarly, the location, number, dimensions and shaped of the bridges, the shape of the resonators, and the unitary resonator assembly may be modified to change the coupling value. Changes in the coupling value result in changes in the resonance modes of the 2-pole DR filter. Specifically, the filter may exhibit TE, TM and HE modes, in single, dual or triple modes. Furthermore, the number of additional resonators may be increased to form unitary resonator assemblies for multi-pole filters without departing from the scope of the present invention.

Figure 5A:
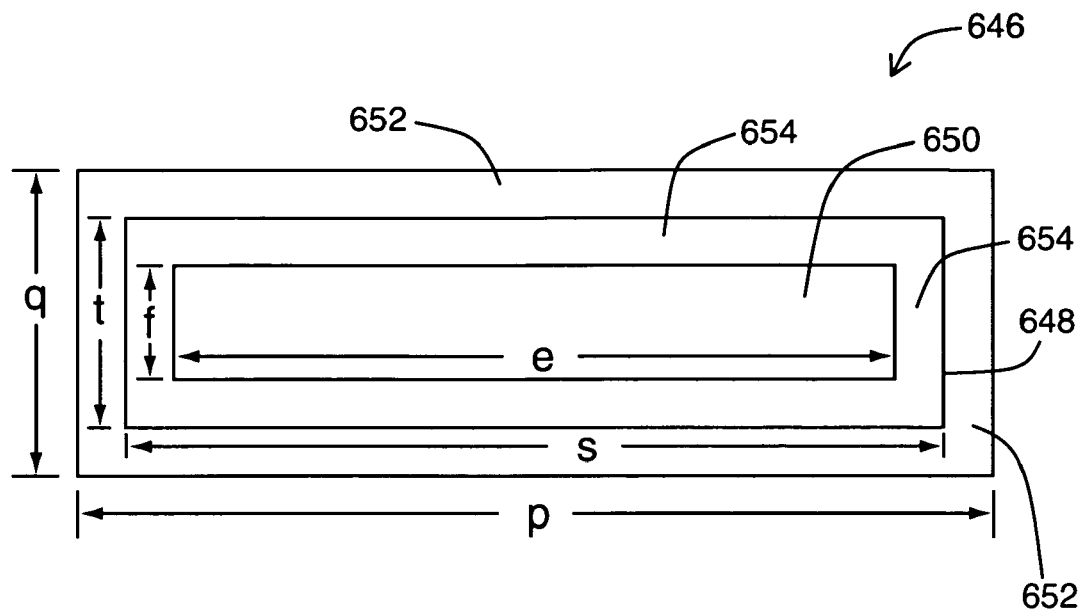
FIG. 5A is a top view of an exemplary embodiment of a unitary mounting structure for a 2-pole DR filter.
Figure 5B:
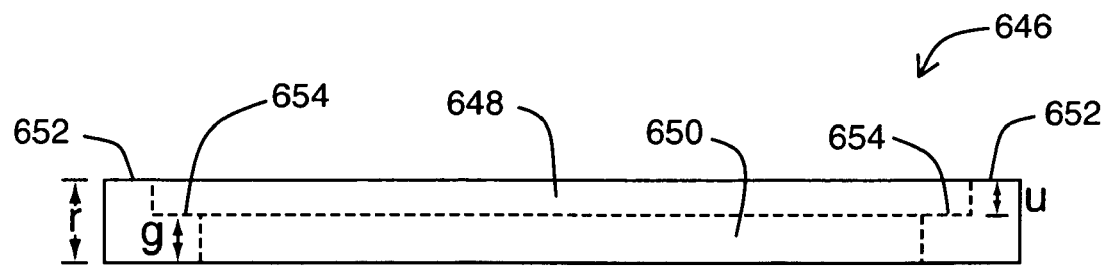
FIG. 5B is a cross-sectional side view of the unitary mounting structure of FIG. 5A.

FIGS. 5A and 5B show a top and cross-sectional side view, respectively, of an exemplary embodiment of a unitary mounting structure 646 for supporting any of the unitary resonator assemblies 10, 110, 210 shown in FIGS. 1A to 1D and FIG. 2 in a DR filter. The unitary mounting structure 646 is formed from a single piece of dielectric material having a low dielectric constant and low loss. The unitary mounting structure 646 in this embodiment has a generally rectangular shape, with outer dimensions of length p, width q, and a depth r. The length p and width r of the unitary mounting structure 646 are configured to fit the interior of a 2-pole DR filter. The depth r of the unitary mounting structure 646 is configured to be less than the depth of the interior of a 2-pole DR filter.

The unitary mounting structure 646 defines an assembly support indentation 648 and a resonance cavity 650. The assembly support indentation 648 has a generally rectangular shape having interior dimensions of length s, width t, and depth u. The length s and width t of the interior of the assembly support indentation 648 are shorter than the length p, and width q, respectively, of the outer dimensions of the unitary mounting structure 646, and are marginally longer than the length x and width y, respectively, of the unitary resonator assembly 10 shown in FIGS. 1A and 1B. The depth u of the assembly support indentation 648 is shorter than the depth r of the unitary mounting structure 646, and is also shorter than the depth z of the unitary resonator assembly 110. The assembly support indentation 648 is positioned within the unitary resonator assembly 610 to leave a spacing border 652 inside the perimeter of the length p and width q of the unitary resonator assembly 646.

The resonance cavity 650 has a generally rectangular shape with interior dimensions of length e, width f, and depth g. The length e and width f are shorter than the length s and width t, respectively, of the assembly support indentation 648. The depth g of the resonance cavity 650 is equal to the difference between the depth r of the unitary mounting structure 646 and the depth u of the assembly support indentation 648. The resonance cavity 650 is positioned within the assembly support indentation 648 to leave a support shelf 654 inside the perimeter of the length e and width f of the unitary resonator assembly 646.

The dimensions and shape of the unitary mounting structure 646 described above may be altered to accommodate a variety of unitary resonator assemblies for 4-pole DR filters, other multi-pole filters, triplet DR filters, and DR diplexers and multiplexers, where the unitary resonator assembly is analogous to the unitary resonator assemblies described above, without departing from the scope of the invention.

It will be understood that the unitary mounting structure 646 shown in FIGS. 5A and 5B is one exemplary embodiment of a mounting structure. Various dimensions and components of the unitary mounting structure may be modified, such as the depth r, which may be equal to the depth of the housing of a filter, and the resonance cavity, which may be eliminated from the unitary mounting structure, without departing from the scope of the invention.

Figure 5C:
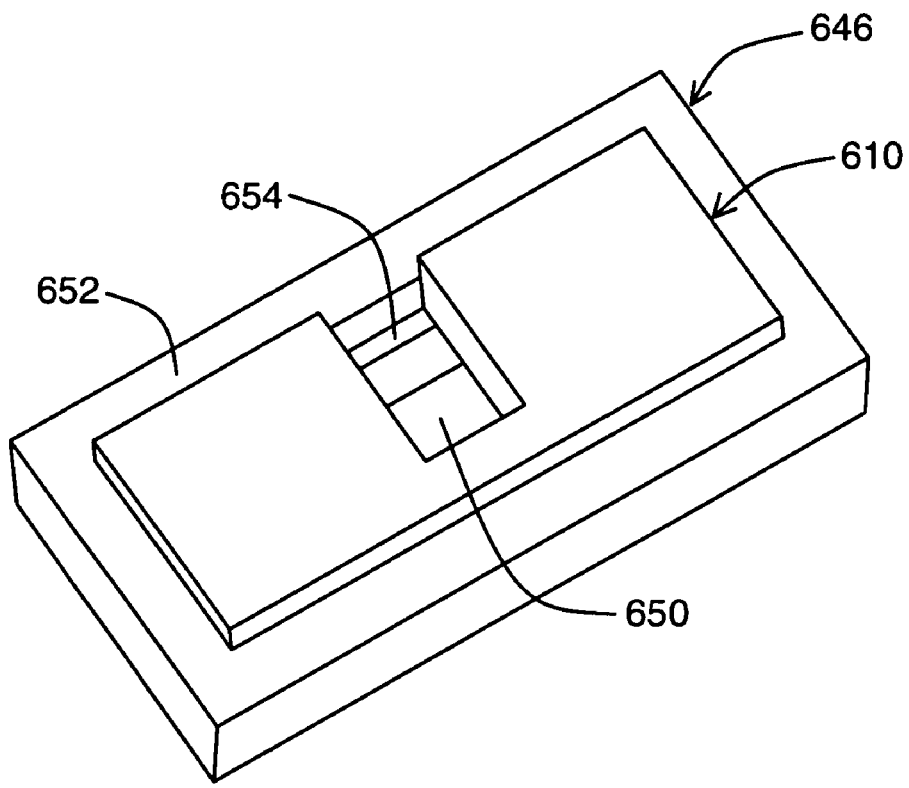
FIG. 5C is a top perspective view of another exemplary embodiment of a unitary resonator assembly for a 2-pole DR filter of FIGS. 1A and 1B supported by the unitary mounting structure of FIG. 5A.
Figure 5D:
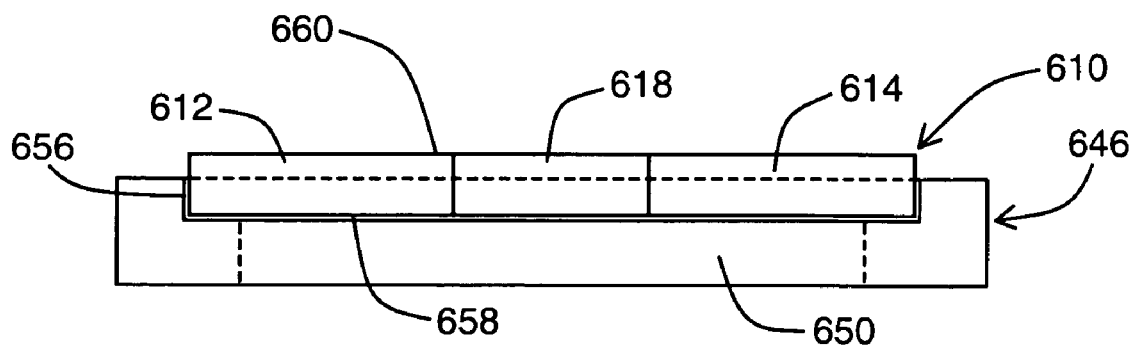
FIG. 5D is a cross-sectional side view of the exemplary embodiment of FIG. 5C of a unitary resonator assembly for a 2-pole DR filter of FIGS. 1A and 1B supported by the unitary mounting structure of FIG. 5A.

FIGS. 5C and 5D show a perspective and cross-sectional side view, respectively, of an exemplary embodiment of a unitary resonator assembly 610 for a 2-pole DR filter mounted in the unitary mounting structure 646. It should be noted that the unitary resonator assembly 610, is also illustrated as the unitary resonator assembly 10 of FIG. 1A. The unitary resonator assembly 610 fits into the assembly support indentation 648, and rests on the support shelf 654 above the resonance cavity 650. Each of the first and second resonators 612, 614 is supported on three sides by the support shelf 654, and the bridge 618 is supported by the support shelf 654. The unitary resonator assembly 610 may be fixed in the assembly support indentation 648 with a thin adhesive layer 656. When the unitary resonator assembly 610 is mounted on the unitary mounting structure 646, an inner face 658 of the unitary resonator assembly 610 rests against the support shelf 654 and faces the resonance cavity 650. An outer face 660 of the unitary resonator assembly 610 faces away from the unitary mounting structure 646.

It will be understood that the unitary mounting structure 646 shown in FIGS. 5C and 5D is one exemplary embodiment of a mounting structure. Various dimensions and components of the unitary mounting structure may be modified, such as the depth r, which may be equal to the depth of the housing of a filter, and the resonance cavity, which may be eliminated from the unitary mounting structure, without departing from the scope of the invention.

In operation, the unitary mounting structure 646 holds the resonators in position in a 2-pole DR filter. The spacing border 652 prevents direct contact between the unitary resonator assembly 610 and the interior of the filter. The resonance cavity 650 allows the resonators to operate with the desired resonance characteristics.

Figure 6:
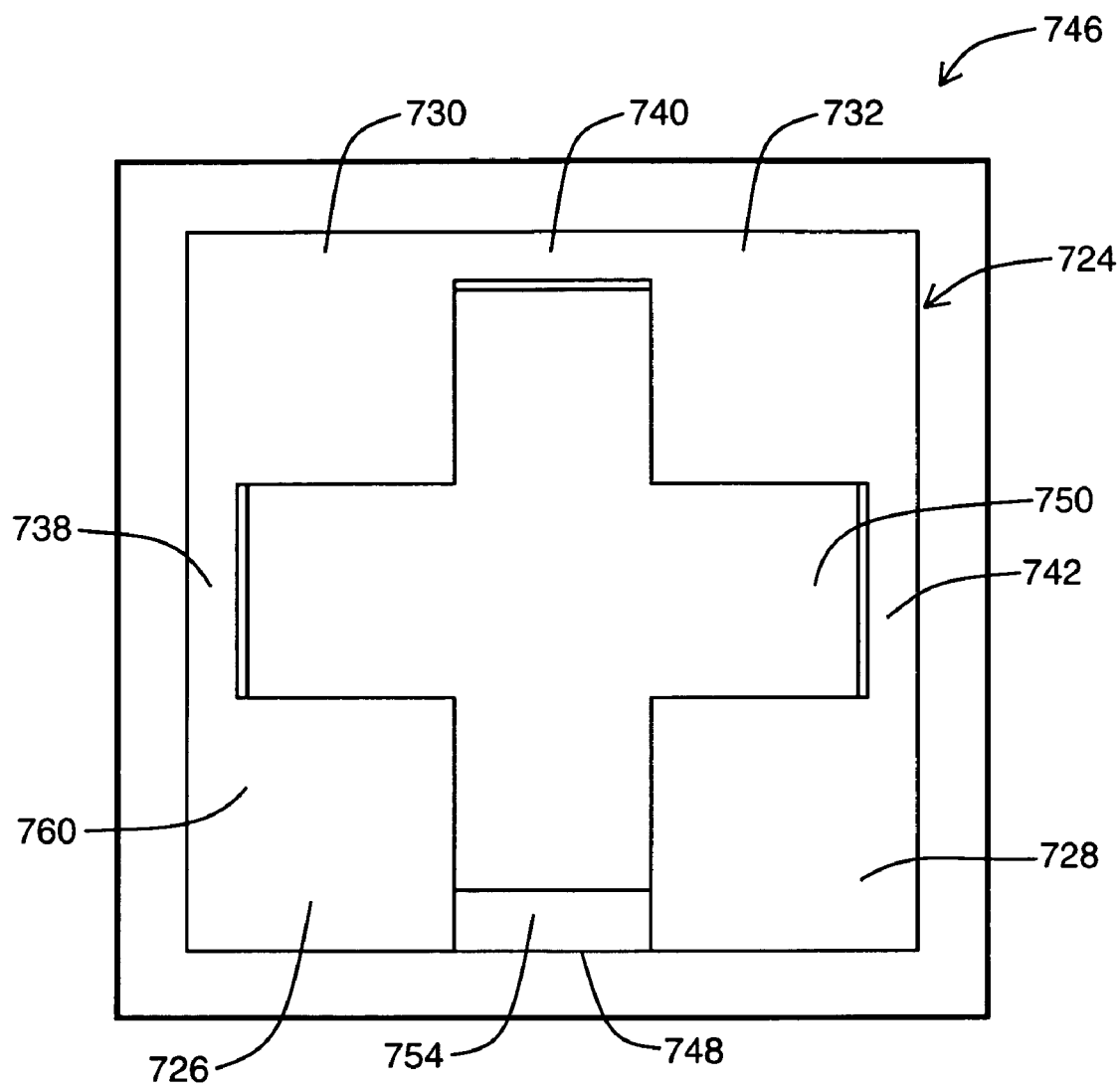
FIG. 6 is a top view of the embodiment of a unitary resonator assembly for a 4-pole DR filter of FIG. 3A supported by another exemplary embodiment of the unitary mounting structure.

FIG. 6 shows a top view of the unitary resonator assembly 724 for a 4-pole DR filter mounted in a unitary mounting structure 746 for a 4-pole DR filter. It should be noted that the unitary resonator assembly 724 is also illustrated as the unitary resonator assembly of FIG. 4. The unitary mounting structure 746 for a 4-pole DR filter is identical in structure and composition to the unitary mounting structure 646 for a 2-pole DR filter, but the dimensions of the unitary mounting structure 646 are altered to accommodate the dimensions of the unitary resonator assembly 724 for a 4-pole DR filter.

It will be understood that, as described above with respect to the mounting structures of FIGS. 5A and 5B, the unitary mounting structure 646 shown in FIG. 4 is one exemplary embodiment of a mounting structure. Various dimensions and components of the unitary mounting structure may be modified, such as the depth r, which may be equal to the depth of the housing of a filter, and the resonance cavity, which may be eliminated from the unitary mounting structure, without departing from the scope of the invention.

The unitary resonator assembly 724 fits into the assembly support indentation 748, and rests on the support shelf 754 above the resonance cavity 750. Each of the input resonator 726, output resonator 728, first additional resonator 730 and second additional resonator 732 is supported on two adjacent sides by the support shelf 754, and the first bridge 738, second bridge 740 and third bridge 742 are supported by the support shelf 754. The unitary resonator assembly 724 may be fixed in the assembly support indentation 748 with a thin adhesive layer (not shown). When the unitary resonator assembly 724 is mounted on the unitary mounting structure 746, an inner face (not shown) of the unitary resonator assembly 724 rests against the support shelf 754 and faces the resonance cavity 750. An outer face 760 of the unitary resonator assembly 724 faces away from the unitary mounting structure.

In operation, the unitary mounting structure 746 holds the resonators in position within a 4-pole DR filter. The spacing border 752 prevents direct contact between the unitary resonator assembly 724 and the interior of the filter. The resonance cavity 750 allows the resonators 726, 728, 730, 732 to operate with the desired resonance characteristics.

Figure 7A:
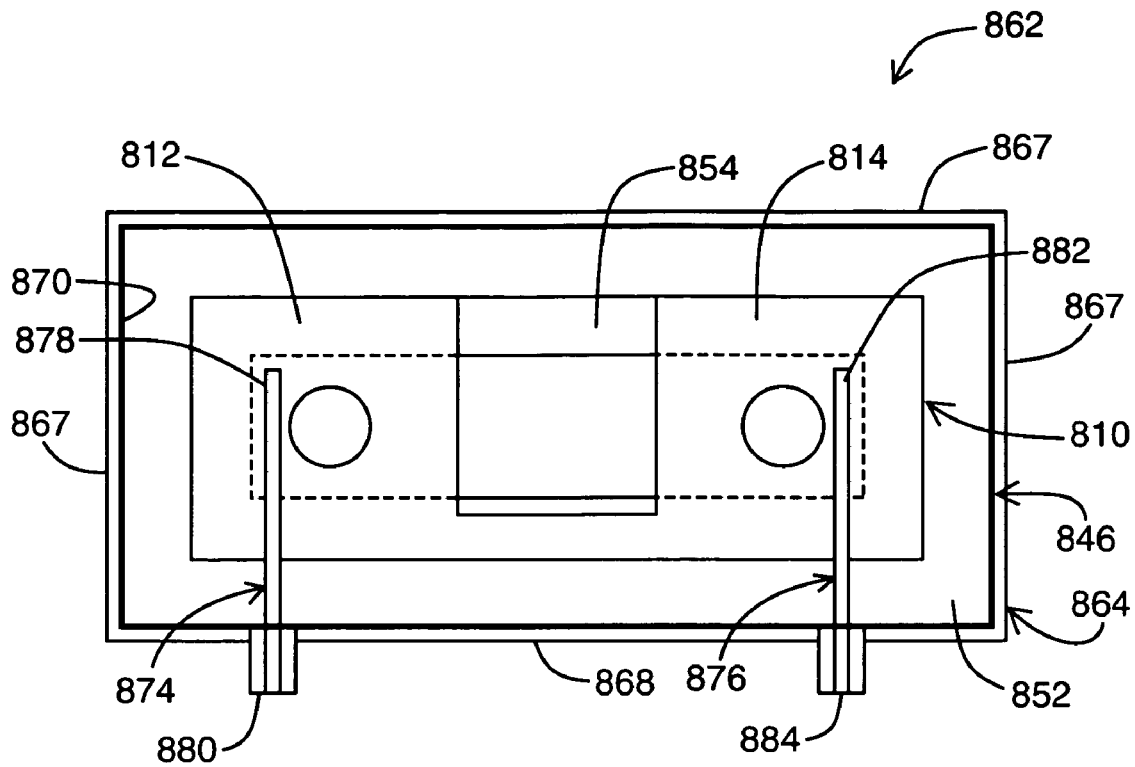
FIG. 7A is a cross-sectional top view of an exemplary embodiment of a 2-pole DR filter.
Figure 7B:
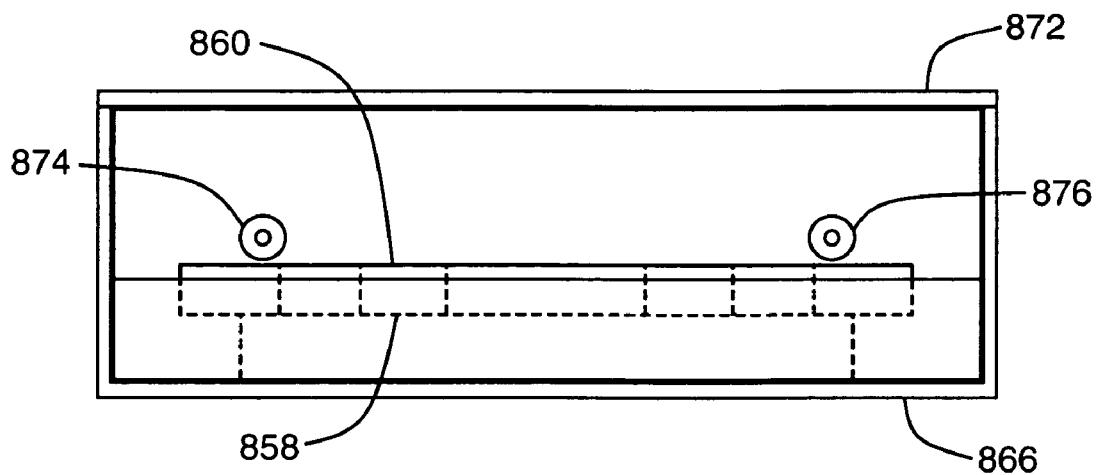
FIG. 7B is a cross-sectional side view of 2-pole DR filter of FIG. 7A.

Reference is now made to FIGS. 7A and 7B, which are cross-sectional top and side views, respectively, of an exemplary embodiment of a 2-pole DR filter 862. The 2-pole DR filter 862 includes a unitary resonator assembly 810, also illustrated in FIG. 2, as unitary resonator assembly 310, supported by a unitary mounting structure 846. The unitary resonator assembly 810 is supported by the support shelf 854 of the unitary mounting structure 846, also illustrated as the unitary mounting structure 646 in FIGS. 5C and 5D. The unitary resonator assembly 810 may be fixed to the unitary mounting structure 846 by a thin adhesive layer (not shown).

The unitary resonator assembly 810 and the unitary mounting structure 846 are housed in a metallic housing 864 having a floor 866, three blank walls 867, and one coupling wall 868. Each wall 867, 868 has an inner surface 870 facing the interior of the housing 864.

The unitary mounting structure 846 is positioned on the floor 866 of the metallic housing 864 such that the inner face 858 of the unitary resonator assembly 810 faces the floor 866 of the housing 864, and the outer perimeter of the spacing border 852 of the unitary mounting structure 846 is adjacent to the inner surfaces 870 of the four walls 867, 868. The housing 864 further comprises a cover 872. The cover 872 is generally parallel to the outer face 860 of the unitary resonator assembly 810, but is spaced from the outer face 860 of the unitary resonator assembly 810.

It will be appreciated that the unitary mounting assembly 846 employed in the 2-pole filter 862 described above may be modified without departing from the spirit of the invention. In some embodiments, the dimensions and components of the single unitary mounting structure may be changed. In other embodiments, more than one unitary mounting structure may be used to clamp the unitary resonator structure 810 in place. In still other embodiments, prior art mounting structures may be used to support the unitary resonator assembly 810 in the 2-pole filter 862. Alternatively, in some embodiments, the 2-pole DR filter may not comprise a mounting structure, and the unitary resonator assembly 810 may rest directly on the floor 866 of the housing 864.

The 2-pole DR filter further comprises an input probe 874 and an output probe 876 that pass through the coupling wall 868. The input probe 874 has an interior input end 878 and an outer input connection end 880. The interior input end 878 of the input probe 874 is electromagnetically coupled to the input resonator 812. The outer input connection end 880 of the input probe 874 may be connected to a coaxial cable (not shown) for receiving an electromagnetic wave. The output probe 876 has an interior output end 882 and an outer output connection end 884. The interior output end 882 of the output probe 876 is electromagnetically coupled to the output resonator 814. The outer output connection end 884 of the output probe 876 may be connected to a coaxial cable (not shown) for transmitting a filtered electromagnetic wave.

It will be understood that the positions of the input probe 874 and output probe 876 may be modified to change the coupling value and the resonance modes of the 2-pole DR filter. Specifically, the filter may exhibit TE, TM and HE modes, in single, dual or triple modes.

In other embodiments, one or both of the input probe 874 and output probe 876 may be replaced with an input or output feed, where the input or output feed is a strip conductor mounted on the outer surface of the unitary resonator assembly 810. The strip conductor may be formed by lithography, printing with metallic ink, attaching a piece of metallic tape, or any other means known in the art.

In still other embodiments, the 2-pole DR filter 862 may include additional structures between the first resonator 812 and second resonator 814 to modify the coupling value and resonance modes of the 2-pole DR filter 862.

In operation, an input coaxial cable (not shown) may be connected to the outer input connection end 880 of the input probe 874 to introduce an electromagnetic wave into the 2-pole DR filter 862 through the input probe 874. The electromagnetic coupling between the input probe 874, the input resonator 812, and the output resonator 814 produces a filtering resonance response of the DR filter 862 to the electromagnetic wave. A filtered electromagnetic wave is transmitted to the output probe 876 through the electromagnetic coupling being the output resonator 814 and the output probe 876. An output coaxial cable (not shown) may be coupled to the outer output connection end 884 of the output probe 876 for the transmission of the filtered EM wave.

It will be appreciated that any embodiment of the unitary resonator assembly for a 2-pole filter 862 may be implemented in the 2-pole filter 862 as described above with respect to the embodiment shown in FIGS. 7A and 7B.

Figure 8A:
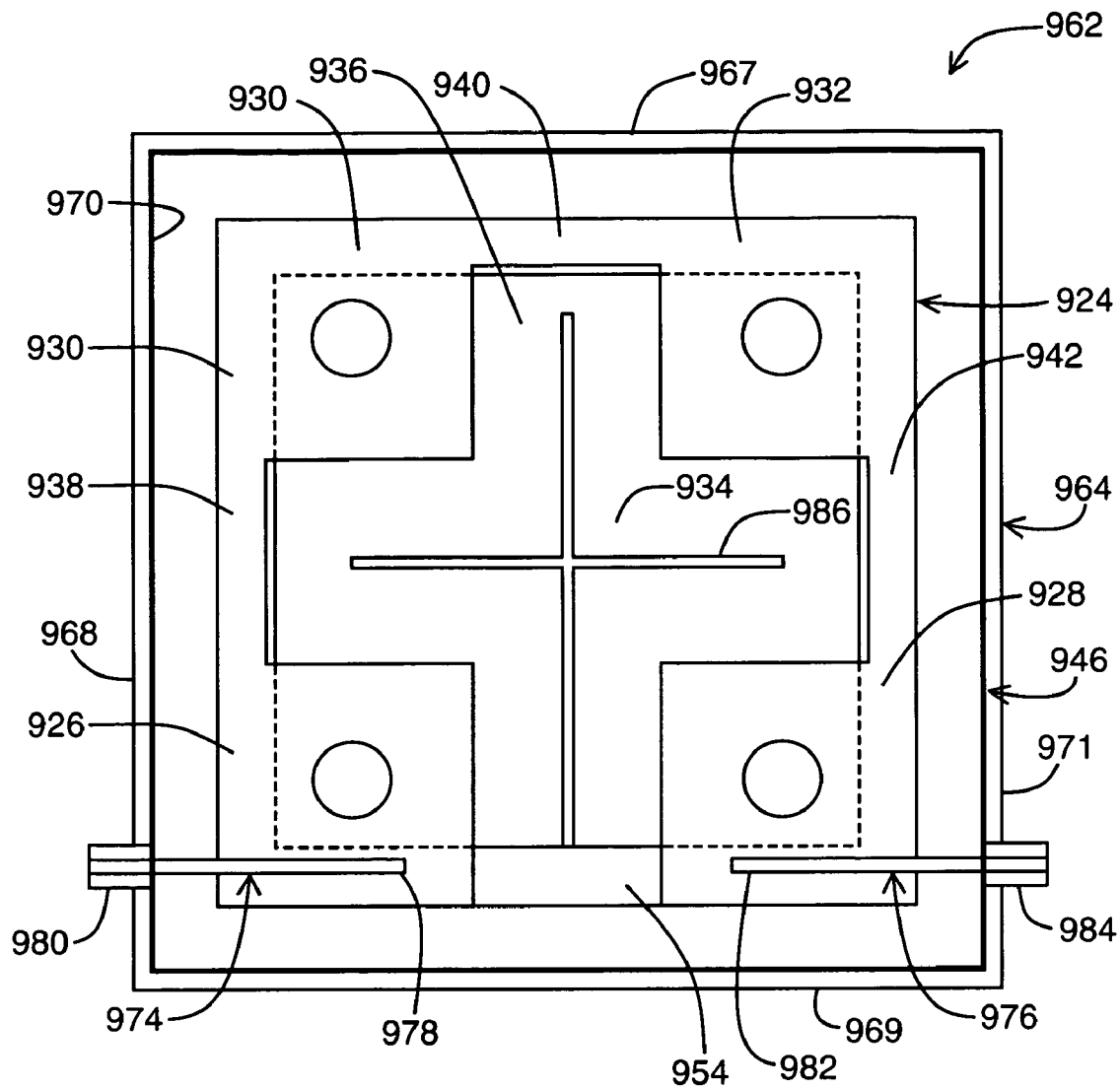
FIG. 8A is a cross-sectional top view of an exemplary embodiment of a 4-pole DR filter.
Figure 8B:
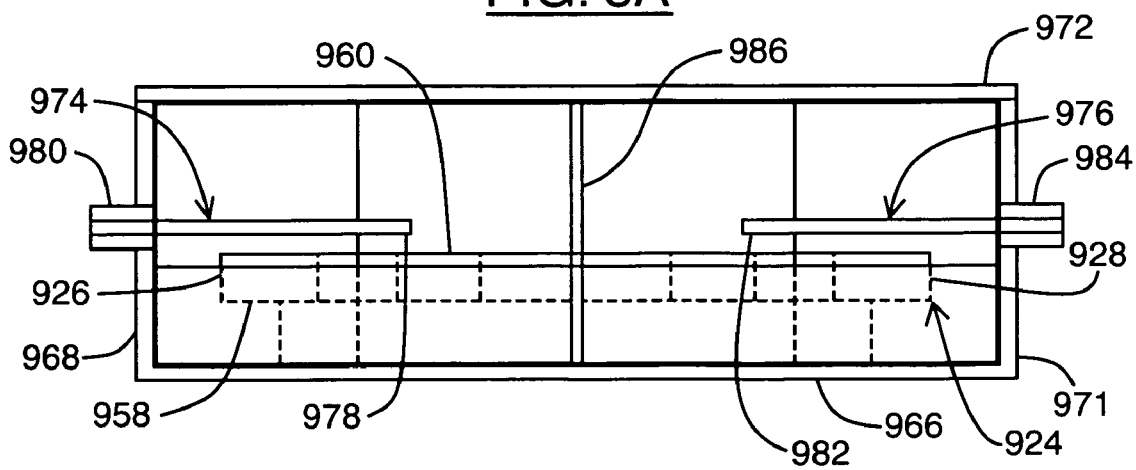
FIG. 8B is a cross-sectional side view of the 4-pole DR filter of FIG. 8A.

Reference is now made to FIGS. 8A and 8B, which are cross-sectional top and side views, respectively, of an exemplary embodiment of a 4-pole DR filter 962. The 4-pole DR filter 962 comprises a unitary resonator assembly 924, also illustrated as the unitary resonator assembly 524 in FIG. 4, supported by a unitary mounting structure 946. The unitary resonator assembly 924 is supported by the support shelf 954 of the unitary mounting structure 946 as described above with respect to FIG. 6. The unitary resonator assembly 924 may be fixed to the unitary mounting structure 946 by a thin adhesive layer (not shown).

The unitary resonator assembly 924 and the unitary mounting structure 946 are housed in a metallic housing 964 having a floor 966, a first blank wall 967, a second blank wall 969, an input coupling wall 968 and an output coupling wall 971. The input coupling wall 968 and output coupling wall 971 are opposing walls. Each of the first blank wall 967, second blank wall 969, input coupling wall 968 and output coupling wall 971, has an inner surface 970 facing the interior of the housing 964.

The unitary mounting structure 946 is positioned on the floor 966 of the metallic housing 964 such that the inner face 958 of the unitary resonator assembly 924 faces the floor 966 of the housing, and the outer perimeter of the spacing border 952 of the unitary mounting structure 946 is adjacent to the inner surfaces 970 of the four walls 967, 969, 968, 971. The housing 964 further comprises a cover 972. The cover 972 is generally parallel to the outer face 960 of the unitary resonator assembly 924, but is spaced from the outer face 960 of the unitary resonator assembly 924.

It will be appreciated that the unitary mounting structure 946 employed in the 4-pole filter 962 described above may be modified without departing from the spirit of the invention. In some embodiments, the dimensions and components of the single unitary mounting structure 946 may be changed. In other embodiments, more than one unitary mounting structure 946 may be used to clamp the unitary resonator assembly 924 in place. In still other embodiments, prior art mounting structures may be used to support the unitary resonator assembly 924 in the 2-pole filter 862. Alternatively, in some embodiments, the 2-pole DR filter may not comprise a mounting structure, and the unitary resonator assembly 924 may rest directly on the floor 966 of the housing 964.

The 4-pole DR filter 962 further comprises an input probe 974, and an output probe 976, that pass through the input coupling wall 968, and output coupling wall 971, respectively. The input probe 974 has an interior input end 978 and an outer input connection end 980. The interior input end 978 of the input probe 974 is electromagnetically coupled to the input resonator 926. The outer input connection end 980 of the input probe 974 may be connected to a coaxial cable (not shown) for receiving an electromagnetic wave. The output probe 976 has an interior output end 982 and an outer output connection end 984. The interior output end 982 of the output probe 976 is electromagnetically coupled to the output resonator 928. The outer output connection end 984 of the output probe 976 may be connected to a coaxial cable (not shown) for transmitting a filtered electromagnetic wave.

It will be understood that the positions of the input probe 974 and output probe 976 may be modified to change the coupling value and the resonance modes of the 2-pole DR filter 962. Specifically, the 2-pole DR filter 962 may exhibit TE, TM and HE modes, in single, dual or triple modes.

In other embodiments, one or both of the input probe 974 and output probe 976 may be replaced with an input or output feed, where the input or output feed is a strip conductor mounted on the outer surface of the unitary resonator assembly 924. The strip conductor may be formed by lithography, printing with metallic ink, attaching a piece of metallic tape, or any other means known in the art.

The 4-pole DR filter 962 further comprises a cross-shaped coupling fin 986 located in the cross-shaped air gap 934 in the unitary resonator assembly 924. The coupling fin 986 spans the distance between the floor 966 of the housing 964 and the cover 972. The coupling fin 986 extends along each gap branch 936 toward the inner surfaces 970 of the first blank wall 967, the second blank wall 969, the input coupling wall 968, and the output coupling wall 971. The fin 986 extends only partially along the gap branches 936 separating the input resonator 926 from the first additional resonator 930, the first additional resonator 930 from the second additional resonator 932, and the second additional resonator 932 from the output resonator 928, and does not contact the inner surface 970 of the input coupling wall 968, the output coupling wall 971 or the first blank wall 967. The fin extends the along the entire gap branch that separates the input resonator 926 from the output resonator 928, and contacts the second blank wall 969.

It will be understood that in some embodiments, the shape or position of the coupling fin 986 may be modified, or the coupling fin 986 may be omitted from the 4-pole DR filter 962 in order to change the coupling value and the resonant modes of the 4-pole DR 962 filter.

In operation, an input coaxial cable (not shown) may be connected to the outer input connection end 980 of the input probe 974 to introduce an electromagnetic wave into the 4-pole DR filter 962 through the input probe 974. The coupling fin 986, combined with the air gap 934 and bridges 938, 940, 942 provides a desired electromagnetic coupling between the input resonator 926, the first additional resonator 930, the second additional resonator 932 and the output resonator 928. The electromagnetic coupling produces a filtering resonance response of the DR filter to the electromagnetic wave. A filtered electromagnetic wave is transmitted to the output probe 976 through the electromagnetic coupling being the output resonator 928 and the output probe 976. An output coaxial cable (not shown) may be coupled to the outer output connection end 984 of the output probe 976 for the transmission of the filtered EM wave.

It will be appreciated that any embodiment of the unitary resonator assembly for a 4-pole filter may be implemented in the 4-pole filter as described above with respect to the embodiment shown in FIGS. 8A and 8B.

Figure 9A:
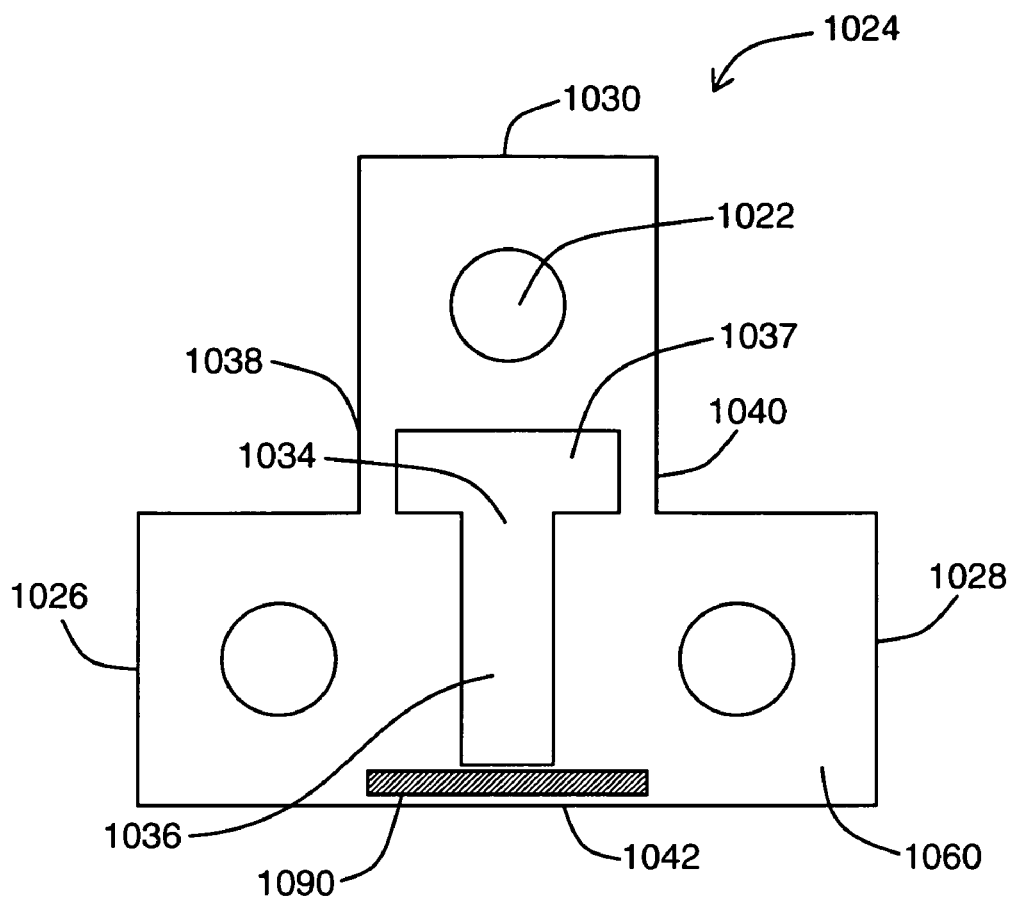
FIG. 9A is a top view of another exemplary embodiment of a unitary resonator assembly for use in a triplet DR filter.
Figure 9B:
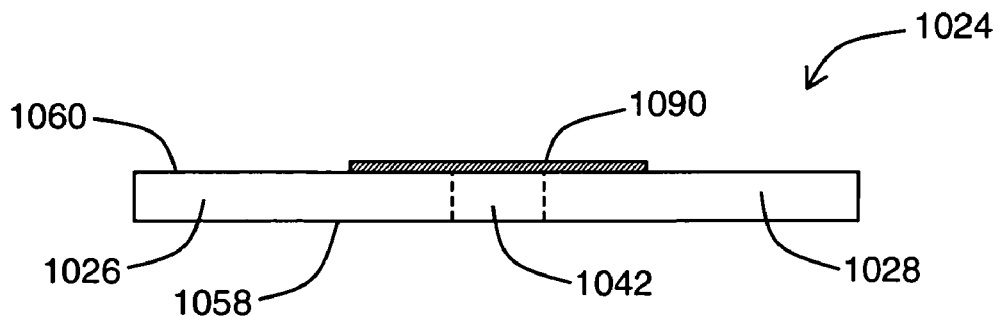
FIG. 9B is a cross-sectional side view of the unitary resonator assembly of FIG. 9A.

Reference is now made to FIGS. 9A and 9B, which show top and cross-sectional side views, respectively, of an exemplary embodiment of a unitary resonator assembly 1024 for use in an asymmetric triplet DR filter with cross coupling. The unitary resonator assembly 1024 of this embodiment is generally inverse T-shaped. The unitary resonator assembly 1024 comprises an input resonator 1026, an output resonator 1028, and one additional resonator 1030 arranged in an inverse T shape. Each resonator defines a circular hole 1022 at its centre. The three resonators 1026, 1028, 1030 are separated by a T-shaped air gap 1034 composed of a T-stem gap branch 1036 and a T-bar gap branch 1037. The T-stem gap branch 1036 separates the input resonator 1026 from the output resonator 1028. The T-bar gap branch 1037 separates the additional resonator 1030 from the input resonator 1026 and the output resonator 1028.

The unitary resonator assembly 1024 further comprises three bridges 1038, 1040, 1042. The input resonator 1026 and the additional resonator 1030 are joined by a first bridge 1038, the additional resonator 1030 and output resonator 1028 are joined by a second bridge 1040, and the input resonator 1026 and output resonator 1028 are joined by a third bridge 1042. Each of the three bridges 1038, 1040, 1042 is located at the outer end of the gap branch 1036, 1037 that it bridges, adjacent to the perimeter of the unitary resonator assembly 1024.

It will be understood that the shape, number and position of the holes in the unitary resonator assembly 1024 may be modified to achieve a new coupling value, without departing from the scope of the invention. Similarly, the location, number, dimensions and shaped of the bridges, the shape of the resonators, and the unitary resonator assembly may be modified to change the coupling value. Changes in the coupling value result in changes in the resonance modes of the 3-pole DR filter. Specifically, the filter may exhibit TE, TM and HE modes, in single, dual or triple modes.

The unitary resonator assembly 1024 has an outer face 1060 and an inner face 158. In one embodiment, where negative cross coupling in the asymmetric triplet DR filter is desired, the unitary resonator assembly 1024 further includes a conductor strip line 1090 on the outer face 1060. The conductor strip line 1090 extends from a point on the input resonator 1026, across the third bridge 1042, to a point on the output resonator 1028. The conductor strip 1090 is fixed to the outer face 1060 of the unitary resonator assembly 1024 by any means known in the art, including metallic ink printing, lithography or attaching a piece of metallic tape having the desired dimensions.

In operation in a asymmetric triplet DR filter, each of the input resonator 1026, output resonator 1028, and additional resonator 1030 resonates. The presence of the circular holes 1022 suppresses an unwanted spurious resonance mode of the unitary resonator assembly 1024. The combination of the bridges 1038, 1040, 1042 and air gap 1034 provides electromagnetic coupling between the resonators. An additional structure in a asymmetric triplet DR filter may be required to achieve the desired electromagnetic coupling. The first bridge 1038, second bridge 1040, and third bridge 1042 have the additional function of maintaining the relative spatial placement and orientation of each of the input resonator 1026, additional resonator 1030, and output resonator 1028.

The unitary resonator assembly 1024 is formed from a single undivided piece of a dielectric substrate having a high dielectric constant. Any method known in the art, for example laser machining, stereo lithography or waterjet cutting, as described above with respect to the 2-pole unitary resonator assembly shown in FIGS. 1A and 1B, may be used to cut the substrate.

It will be appreciated that in other embodiments, the shape of the individual resonators 1026, 1028, 1030 and of the unitary resonator assembly 1024 may be varied without departing from the scope of the invention.

Figure 10A:
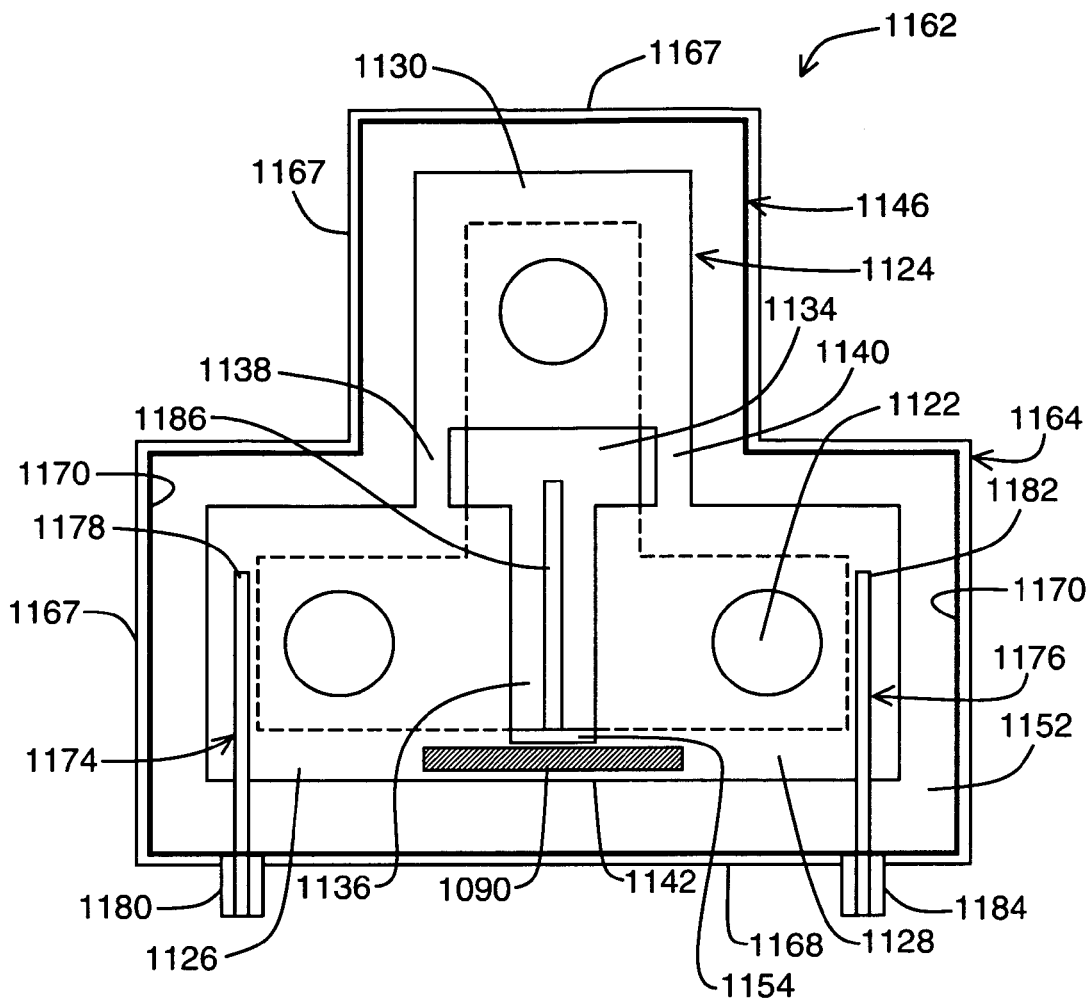
FIG. 10A is a cross-sectional top view of an exemplary triplet DR filter.
Figure 10B:
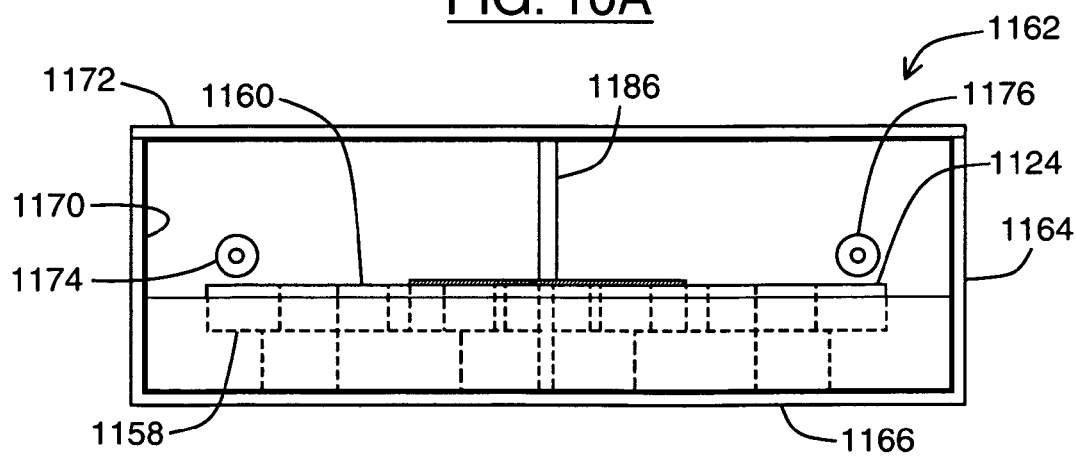
FIG. 10B is a cross-sectional side view of the triplet DR filter of FIG. 10B.

Reference is now made to FIGS. 10A and 10B, which are cross-sectional top and side views, respectively, of an exemplary embodiment of an asymmetric triplet DR filter 1162. The asymmetric triplet DR filter 1162 comprises a unitary resonator assembly 1124, of the embodiment shown in FIGS. 9A and 9B, supported by a unitary mounting structure 1146. The unitary mounting structure 1146 shown in FIGS. 10A and 10B is identical in construction and composition to the unitary mounting structure 646 illustrated in FIG. 5A for a 2-pole DR filter, although the dimensions and shape of the unitary mounting structure 646 have been altered to accommodate the dimensions and shape of the unitary resonator assembly 1124 for a asymmetric triplet DR filter 1152. The unitary mounting structure 1146 comprises a spacing border 1152, and an assembly support shelf 1154. The unitary resonator assembly 1124 is supported by the support shelf 1154 of the unitary mounting structure 1146 as described above with respect to FIG. 6. The unitary resonator assembly 1124 may be fixed to the unitary mounting structure 1146 by a thin adhesive layer (not shown). The unitary resonator assembly 1124 is supported by the assembly support shelf 1154.

The unitary resonator assembly 1124 and the unitary mounting structure 1146 are housed in a metallic housing 1164 having a floor 1166, a coupling wall 1168 and seven blank walls 1167. Each of seven blank walls 1167 and the coupling wall 1168 has an inner surface 1170 facing the interior of the housing 1164.

The unitary mounting structure 1146 is positioned on the floor 1166 of the metallic housing 1164 such that the inner face 1158 of the unitary resonator assembly 1124 faces the floor 1166 of the housing 1164, and the outer perimeter of the spacing border 1152 of the unitary mounting structure 1146 is adjacent to the inner surfaces 1170 of the seven blank walls 1167 and the coupling wall 1168. The housing 1164 further comprises a cover 1172. The cover 1172 is generally parallel to the outer face 1160 of the unitary resonator assembly 1124, but is spaced from the outer face 1160 of the unitary resonator assembly 1124.

It will be appreciated that the unitary mounting structure 1146 employed in the triplet filter 1162 described above may be modified without departing from the spirit of the invention. In some embodiments, the dimensions and components of the single unitary mounting structure may be changed. In other embodiments, more than one unitary mounting structure may be used to clamp the unitary resonator structure 1110 in place. In still other embodiments, prior art mounting structures may be used to support the unitary resonator assembly 1110 in the diplexer 1162. Alternatively, in some embodiments, the diplexer may not comprise a mounting structure, and the unitary resonator assembly 1110 may rest directly on the floor 1166 of the housing 1164.

The asymmetric triplet DR filter 1162 further comprises an input probe 1174, and an output probe 1176, that pass through the coupling wall 1168. The input probe 1174 has an interior input end 1178 and an outer input connection end 1180. The interior input end 1178 of the input probe 1174 is electromagnetically coupled to the input resonator 1126. The outer input connection end 1180 of the input probe 1174 may be connected to a coaxial cable (not shown) for receiving an electromagnetic wave. The output probe 1176 has an interior output end 1182 and an outer output connection end 1184. The interior output end 1182 of the output probe 1176 is electromagnetically coupled to the output resonator 1128. The outer output connection end 1184 of the output probe 1176 may be connected to a coaxial cable (not shown) for transmitting a filtered electromagnetic wave.

It will be understood that the positions of the input probe 1174 and output probe 1176 may be modified to change the coupling value and the resonance modes of the triplet DR filter 1162. Specifically, the triplet DR filter 1162 may exhibit TE, TM and HE modes, in single, dual or triple modes.

In other embodiments, one or both of the input probe 1174 and output probe 1176 may be replaced with an input or output feed, where the input or output feed is a strip conductor mounted on the outer surface of the unitary resonator assembly 1124. The strip conductor may be formed by lithography, printing with metallic ink, attaching a piece of metallic tape, or any other means known in the art.

The asymmetric triplet DR filter 1162 further comprises a coupling fin 1186 located in the air gap 1134 in the unitary resonator assembly 1124. The coupling fin 1186 spans the distance between the floor 1166 of the housing 1164 and the cover 1172. The coupling fin 1186 extends along the T-stem gap 1136 between the third bridge 1142 and the additional resonator 1130. In some embodiments of the asymmetric DR filter 1162, the position of the coupling fin 1186 may be modified, or a coupling fin 1186 may be omitted from the triplet DR filter 1162.

In operation, an input coaxial cable (not shown) may be connected to the outer input connection end 1180 of the input probe 1174 to introduce an electromagnetic wave into the asymmetric triplet DR filter 1162 through the input probe 1174. The coupling fin 1186, combined with the air gap 1134 and bridges 1138, 1140, 1142 provides a desired electromagnetic coupling between the input resonator 1126, the additional resonator 1130, and the output resonator 1128. The electromagnetic coupling produces a filtering resonance response of the DR filter to the electromagnetic wave. A filtered electromagnetic wave is transmitted to the output probe 1176 through the electromagnetic coupling being the output resonator 1128 and the output probe 1176. An output coaxial cable (not shown) may be coupled to the outer output connection end 1184 of the output probe 1176 for the transmission of the filtered EM wave.

The third bridge 1142 between the input resonator 1126 and the output resonator 1128 provides a cross-coupling effect that produces a transmission zero at one end of the pass band of the filter. In one embodiment, the asymmetric triplet DR filter does not comprise a conductor strip 1090, and has a positive cross-coupling. In the embodiment shown in FIGS. 10A and 10B, the presence of the conductor strip 1090 provides a negative cross-coupling effect. The negative cross-coupling moves the transmission zero to the side of the pass band that is opposite the side of a transmission zero caused by positive cross-coupling. In another embodiment of the triplet DR filter, the negative cross-coupling may be achieved with a coupling probe instead of a conductor strip 1090.

It will be appreciated that any embodiment of a unitary resonator assembly for a asymmetric triplet DR filter may be implemented in a asymmetric triplet DR filter as described above without departing from the scope of the invention.

Figure 11A:
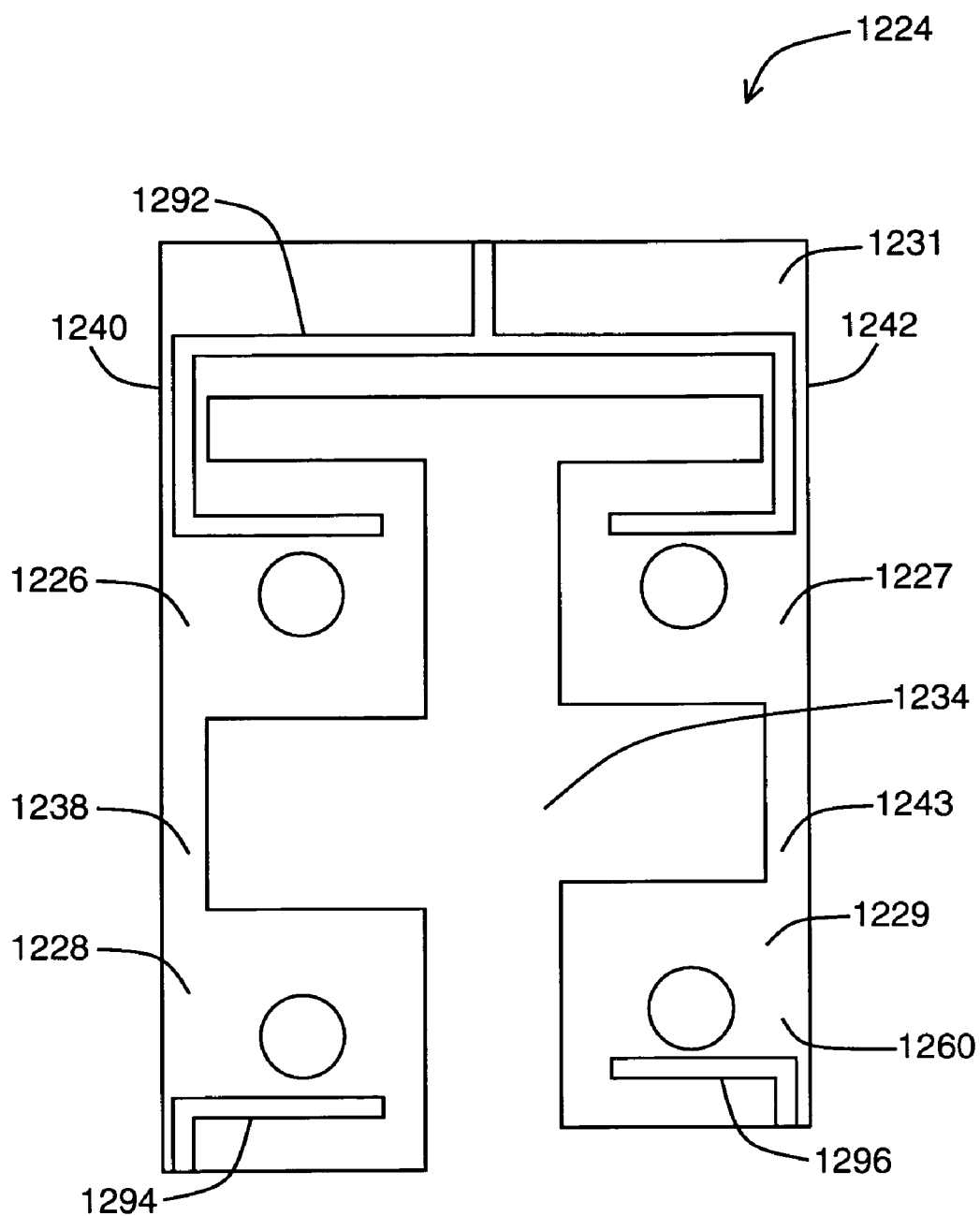
FIG. 11A is a top view of an exemplary embodiment of a unitary resonator assembly for use in a DR diplexer.
Figure 11B:
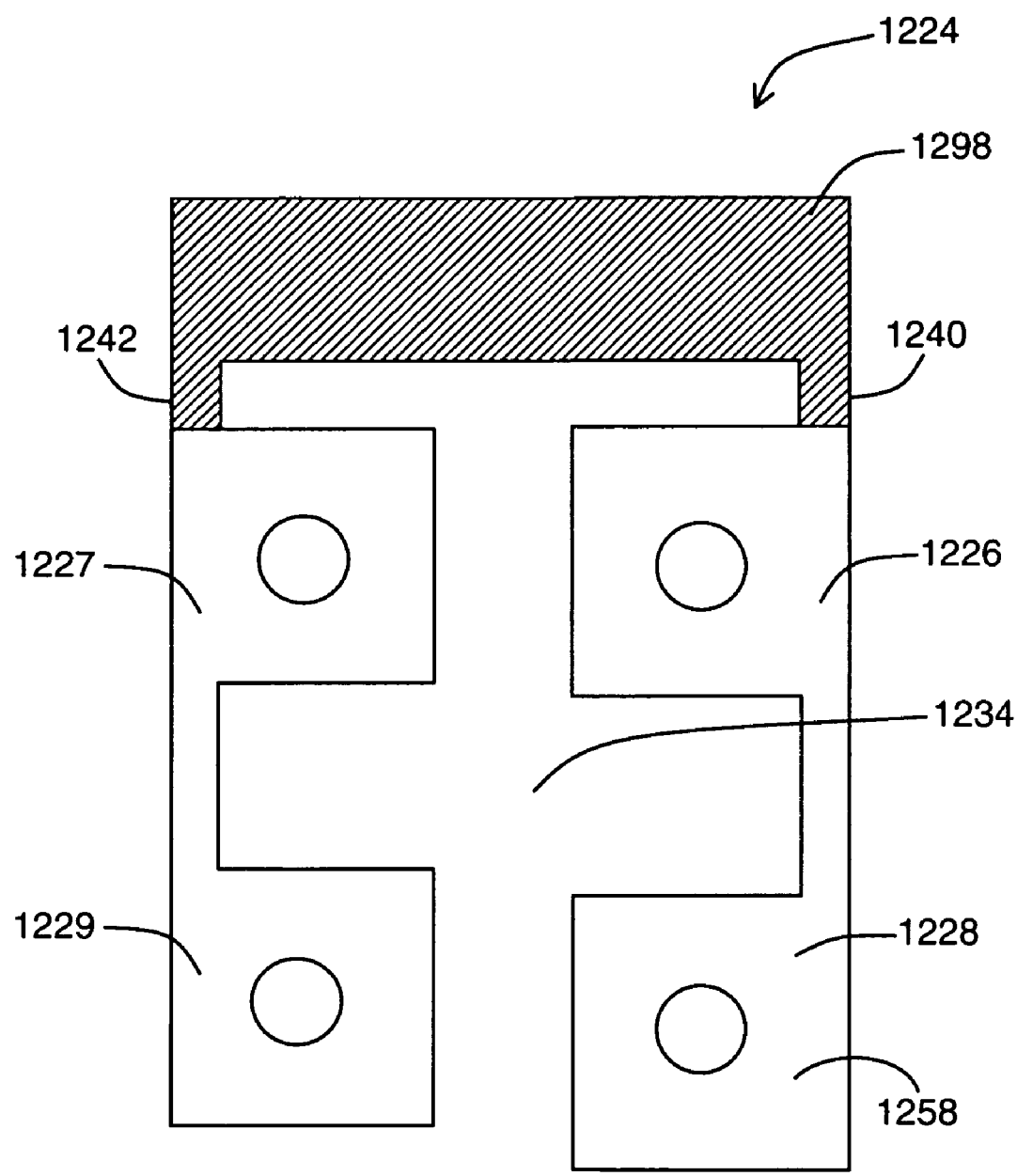
FIG. 11B is a bottom view of the unitary resonator assembly of FIG. 11A.

Reference is now made to FIGS. 11A and 11B, which show a top view, and a bottom view, respectively of a unitary resonator assembly 1224 of the present invention for use in a DR diplexer. The unitary resonator assembly 1224 comprises a first input resonator 1226, a second input resonator 1227, a first output resonator 1228 and a second output resonator 1229, and a junction 1231. The four resonators 1226, 1227, 1228, 1229, and the junction 1231 are separated by an air gap 1234.

The unitary resonator assembly 1224 further comprises a first bridge 1238, a second bridge 1240, a third bridge 1242 and a fourth bridge 1243. The first input resonator 1226 and the first output resonator 1228 are separated by the air gap 1234 and joined by the first bridge 1238, the first input resonator 1226 and the junction 1231 are separated by the air gap 1234 and joined by the second bridge 1240, the junction 1231 and the second input resonator 1227 are separated by the air gap 1234 and joined by the third bridge 1242, and the second input resonator 1227 and the second output resonator 1229 are separated by the air gap 1234 and joined by the fourth bridge 1243. Each of the four bridges 1238, 1240, 1242, 1243 is located at the outer end of the air gap 1234 that it bridges, where the outer end of the air gap 1234 is adjacent to the perimeter of the unitary resonator assembly 1224. The unitary resonator assembly has an outer face 1260, and an inner face 1258.

In operation in a DR diplexer, each of the first input resonator 1226, first output resonator 1228, second input resonator 1227 and second output resonator 1229 resonates. The combination of the bridges 1238, 1240, 1242, 1243 and air gap 1234 provides electromagnetic coupling between the resonators 1226, 1227, 1228, 1229. In the configuration of the unitary resonator assembly 1224 shown in this embodiment, additional structures in a DR diplexer may be required in to achieve the desired electromagnetic coupling. The first bridge 1238, second bridge 1240, third bridge 1242 and fourth bridge 1243 have the additional function of maintaining the relative spatial placement and orientation of each of the first input resonator 1226, second input resonator 1227, first output resonator 1228 and second output resonator 1229, and junction 1231.

It will be understood that the location, number, dimensions and shape of the bridges, the shape of the resonators, and the unitary resonator assembly may be modified to change the coupling value of the unitary resonator assembly. Changes in the coupling value result in changes in the resonance modes of the triplet DR filter. Specifically, the filter may exhibit TE, TM and HE modes, in single, dual or triple modes.

The unitary resonator assembly 1224 is formed from a single undivided piece of a dielectric substrate having a high dielectric constant. Any method known in the art, for example laser machining, stereo lithography or waterjet cutting, as described above with respect to the unitary resonator assembly for a 2-pole DR filter shown in FIGS. 1A and 1B, may be used to cut the substrate.

FIGS. 11A and 11B also show an input feed 1292, a first output feed 1294, and a second output feed 1296. The input feed 1292 branches over the junction 1231, and extends into the first input resonator 1226 and the second input resonator 1227. The first output feed 1294 extends into the first output resonator 1228, and the second output feed 1296 extends into the second output resonator 1229.

Reference is again made to FIG. 11B, which also shows a metallic plane 1298 that lies adjacent to the inner face 1258 of the junction 1231, the second bridge 1240 and the third bridge 1242. The metallic plane may or may not contact the inner face 1258 of the junction 1231. In operation in a DR diplexer, the metallic plane 1298 acts as a ground.

Figure 12A:
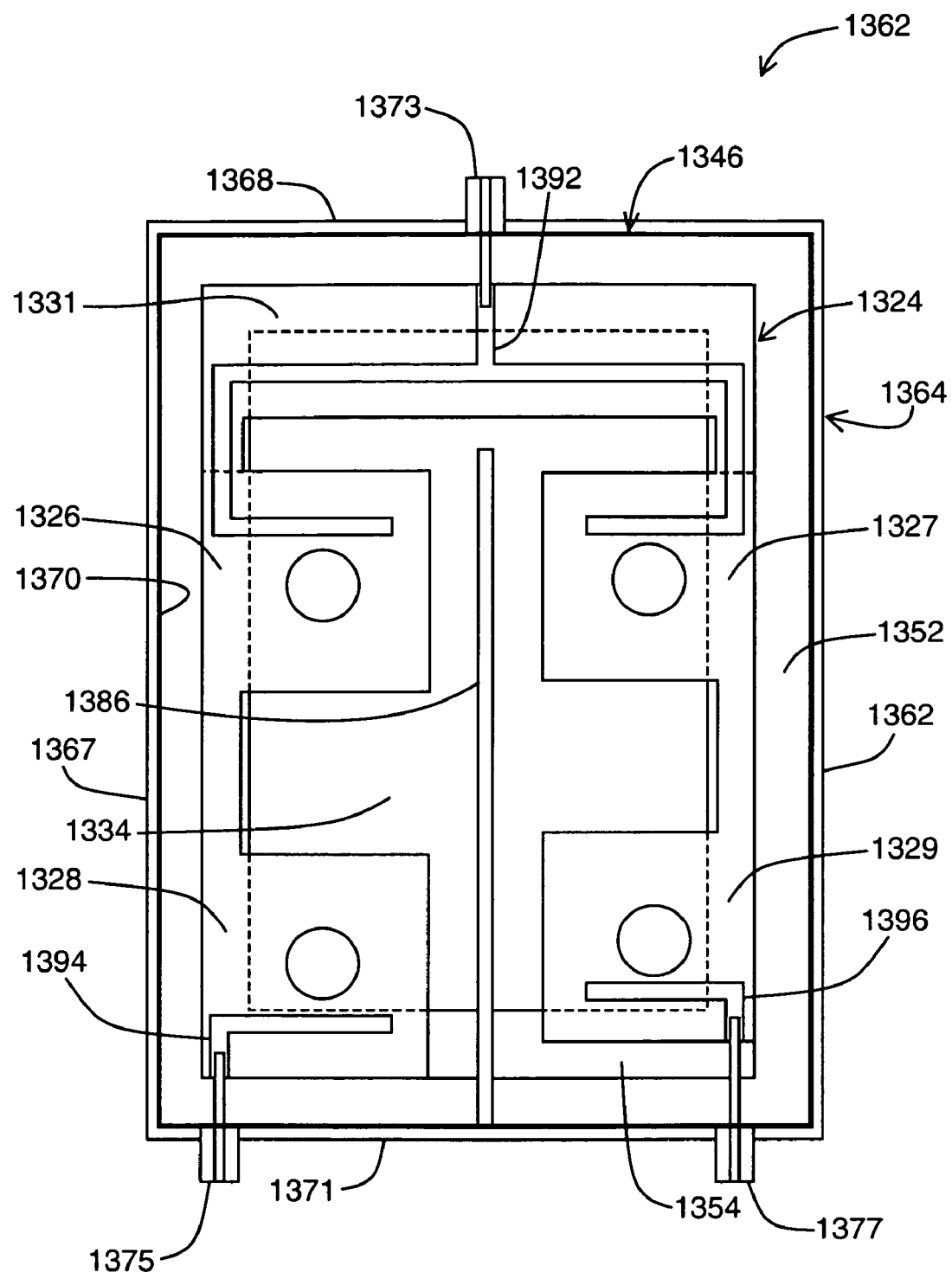
FIG. 12A is a cross-sectional top view of an exemplary embodiment of a DR diplexer.
Figure 12B:
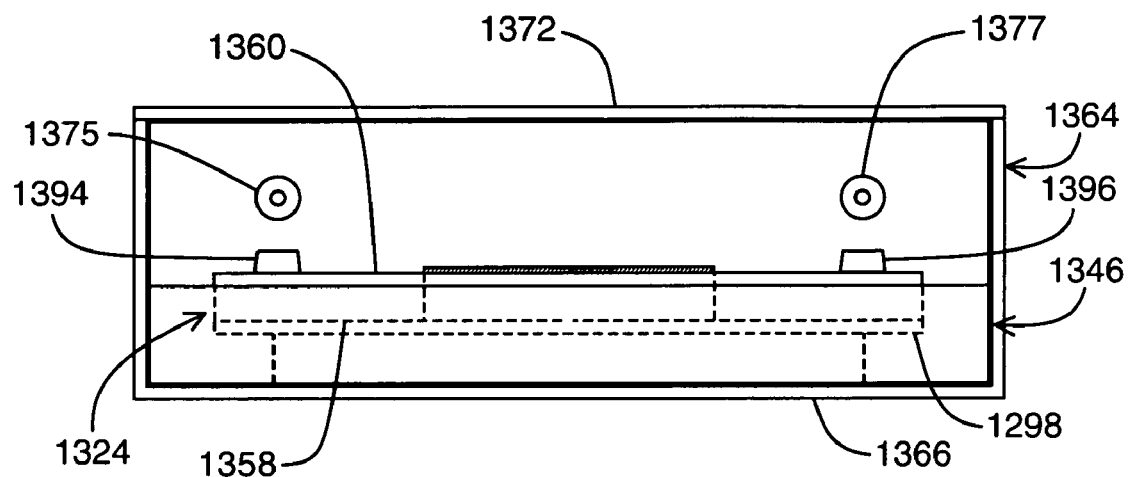
FIG. 12B is a cross-sectional side view of the DR diplexer of FIG. 12A.

Reference is now made to FIG. 12, which shows a cross-sectional top view of a DR diplexer 1362 of the present invention. The DR diplexer 1362 comprises a unitary resonator assembly 1324, similar to the unitary resonator assembly 1224 shown in FIGS. 11A and 11B, supported by a unitary mounting structure 1346. The unitary mounting structure 1346 shown in FIGS. 10A and 10B is identical in construction and composition to the unitary mounting structure 646 for a 2-pole DR filter, but the dimensions and shape of the unitary mounting structure 646 are altered to accommodate the dimensions of the unitary resonator assembly 1324 for a DR diplexer. The unitary mounting structure 1346 includes a spacing border 1352 and an assembly support shelf 1354. The unitary resonator assembly 1324 is supported by the support shelf 1354 of the unitary mounting structure 1346 as described above with respect to FIGS. 5A and 5B. The unitary resonator assembly 1324 may be fixed to the unitary mounting structure 1346 by a thin adhesive layer (not shown).

The unitary resonator assembly 1324 and the unitary mounting structure 1346 are housed in a metallic housing 1364 having a floor 1366, an input coupling wall 1368, an output coupling wall 1371 and two blank walls 1367. Each of two blank walls 1367, the input coupling wall 1368 and the output coupling wall 1371 has an inner surface 1370 facing the interior of the housing 1364.

The unitary mounting structure 1346 is positioned on the floor 1366 of the metallic housing 1364 such that the inner face 1358 of the unitary resonator assembly 1324 faces the floor 1366 of the housing, and the outer perimeter of the spacing border 1352 of the unitary mounting structure 1346 is adjacent to the inner surfaces 1370 of the two blank walls 1367, the input coupling wall 1368 and the output coupling wall 1371. The housing 1364 further comprises a cover 1372. The cover 1372 is generally parallel to the outer face 1360 of the unitary resonator assembly 1324, but is spaced from the outer face 1360 of the unitary resonator assembly 1324.

It will be appreciated that the unitary mounting structure 1346 employed in the DR diplexer 1362 described above may be modified without departing from the spirit of the invention. In some embodiments, the dimensions and components of the single unitary mounting structure 1346 may be changed. In other embodiments, more than one unitary mounting structure 1346 may be used to clamp the unitary resonator structure 1324 in place. In still other embodiments, prior art mounting structures may be used to support the unitary resonator assembly 1324 in the DR diplexer 1362. Alternatively, in some embodiments, the DR diplexer 1362 may not comprise a mounting structure, and the unitary resonator assembly 1324 may rest directly on the floor 1366 of the housing 1364.

The DR diplexer 1362 further comprises an input port 1373, and, a first output port 1375, and a second output port 1377, that pass through the input coupling wall 1368 and output coupling wall 1371, respectively 1371. The input port 1373 allows a coaxial cable to be introduced to the input feed in the DR diplexer 1362. The first output port 1375 and second output port 1377 allow coaxial cables to be introduced to the first output feed 1394, and second output feed 1396, respectively.

The DR diplexer 1362 further comprises a coupling fin 1386 located in the air gap 1334 in the unitary resonator assembly 1324. The coupling fin 1386 spans the distance between the floor 1366 of the housing 1364 and the cover 1372. The coupling fin 1386 spans the distance from the output coupling wall 1371 to a point in the air gap close to, but not contacting, the junction 1331.

In other embodiments, position of the coupling fin 1386 may be changed, or the coupling fin 1386 may be omitted from the DR diplexer 1362. Modifications to the position or presence of the coupling fin 1386 will change the coupling value and resonance modes of the DR diplexer 1362.

In operation, an electromagnetic wave may be introduced into the DR diplexer 1362 through the input port 1373 and into the input feed 1392. The first input resonator 1326 and the first output resonator 1328 produce a first resonance response, and the resulting first filtered electromagnetic signal may be transmitted through the first output feed 1394 and first output port 1375. The second input resonator 1327 and the second output resonator 1329 produce a second resonance response, and the resulting second filtered electromagnetic signal may be transmitted through the second output feed 1396 and second output port 1377.

In other embodiments of the DR diplexer 1362, the input feed and output feeds may be replaced with input and output probes.

It will be appreciated that a variety of unitary resonance assembly configurations may be employed in DR diplexers and DR multiplexers analogous to the DR diplexer 1362 described above, without departing from the scope of the invention.

It will further be understood that the various embodiments of unitary resonator assemblies described above may be used in combination with other unitary resonator assemblies or in combination with prior art resonators in alternative embodiments of DR filters and multiplexers.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A unitary resonator assembly and mounting structure for use in one of a dielectric resonator filter and a dielectric resonator multiplexer, the one of dielectric resonator filter and dielectric resonator multiplexer having a metallic enclosure, said unitary resonator assembly and mounting structure comprising:

(a) a first dielectric resonator;
(b) a second dielectric resonator;
(c) at least one bridge for connecting the first and second dielectric resonators;
(d) the first dielectric resonator, the second dielectric resonator and the at least one bridge being integrally formed within a single piece of dielectric substrate; and
(e) said mounting structure for mounting the unitary resonator assembly within the metallic enclosure, the mounting structure defining an assembly support indentation and a spacing border, and being formed from a dielectric material having a low dielectric constant, such that the unitary resonator assembly is insulated from the metallic enclosure when mounted in the mounting structure.

2. The unitary resonator assembly of claim 1, wherein at least one resonator defines at least one hole.

3. The unitary resonator assembly of claim 1, further comprising at least one conductor strip on the surface of the unitary resonator assembly.

4. The unitary resonator assembly of claim 1, wherein the unitary resonator assembly may resonate in one of a TE mode, a TM mode, a hybrid mode, a single mode, a dual mode, a triple mode.

5. A dielectric resonator filter comprising a metallic enclosure, a unitary resonator assembly and mounting structure, said unitary resonator assembly and mounting structure comprising:
(a) a first dielectric resonator;
(b) a second dielectric resonator;
(c) at least one bridge for connecting the first and second dielectric resonators;
(d) the first dielectric resonator, the second dielectric resonator and the at least one bridge being integrally formed within a single piece of dielectric substrate; and
(e) said mounting structure for mounting the unitary resonator assembly within the metallic enclosure, the mounting structure defining an assembly support indentation and a spacing border, and being formed from a dielectric material having a low dielectric constant, such that the unitary resonator assembly is insulated from the metallic enclosure when mounted in the mounting structure.

6. The dielectric resonator filter of claim 5 wherein at least one resonator of the unitary resonator assembly defines at least one hole.

7. The dielectric resonator filter of claim 5, further comprising at least one coupling fin.

8. The dielectric resonator filter of claim 5 further comprising at least one probe for electromagnetically coupling at least one resonator to a coaxial cable.

9. The dielectric resonator filter of claim 5, further comprising at least one conductor strip on the surface of the unitary resonator assembly for electromagnetically coupling at least one resonator to a coaxial cable.

10. The dielectric resonator filter of claim 5, wherein the dielectric resonator filter may operate in one of a TE mode, a TM mode, a hybrid mode, a single mode, a dual mode, a triple mode.

11. A triplet dielectric resonator filter comprising a unitary resonator assembly, said unitary resonator assembly comprising:
(a) a first dielectric resonator;
(b) a second dielectric resonator;
(c) at least one bridge for connecting the first and second dielectric resonators;
(d) the first dielectric resonator, the second dielectric resonator and the at least one bridge being integrally formed within a single piece of dielectric substrate; and
(e) a conductor strip positioned on the surface of the unitary resonator assembly for negative cross coupling.

12. A dielectric resonator multiplexer comprising a metallic enclosure and a unitary resonator assembly mounted in a mounting structure, said unitary resonator assembly comprising:
(a) a first dielectric resonator;
(b) a second dielectric resonator;
(c) at least one bridge for connecting the first and second dielectric resonators;
(d) the first dielectric resonator, the second dielectric resonator and the at least one bridge being integrally formed within a single piece of dielectric substrate; and
(e) said mounting structure for mounting the unitary resonator assembly within the metallic enclosure, the mounting structure defining an assembly support indentation and a spacing border, and being formed from a dielectric material having a low dielectric constant, such that the unitary resonator assembly is insulated from the metallic enclosure when mounted in the mounting structure.

13. The dielectric resonator multiplexer of claim 12 wherein at least one resonator of the unitary resonator assembly defines at least one hole.

14. The dielectric resonator multiplexer of claim 12, further comprising at least one coupling fin.

15. The dielectric resonator multiplexer of claim 12, further comprising at least one probe for electromagnetically coupling at least one resonator to a coaxial cable.

16. The dielectric resonator multiplexer of claim 12, further comprising at least one conductor strip on the surface of the unitary resonator assembly for electromagnetically coupling at least one resonator to a coaxial cable.

17. The dielectric resonator multiplexer of claim 12, wherein the dielectric resonator multiplexer may operate in one of a TE mode, a TM mode, a hybrid mode, a single mode, a dual mode, a triple mode.

18. A method of manufacturing a unitary resonator assembly and mounting structure for use in one of a dielectric resonator filter and a dielectric resonator multiplexer having a metallic enclosure, said method comprising:
(a) providing a first dielectric material;
(b) forming a unitary resonator assembly by integrally shaping in the first dielectric material a first dielectric resonator, a second dielectric resonator, and at least one bridge for connecting the first and second dielectric resonators; and
(c) from a second dielectric material having a low dielectric constant, forming a mounting structure by defining an assembly support indentation and a spacing border, such that the unitary resonator assembly is insulated from the metallic enclosure when mounted in the mounting structure.

19. The method of claim 18, further comprising providing a conductor strip on the surface of the unitary resonator assembly.

20. The method of claim 18, further comprising shaping at least one hole in at least one of the resonators of the unitary resonator assembly.

* * * * *